(12) United States Patent
Okuno et al.

(10) Patent No.: US 10,909,455 B2
(45) Date of Patent: Feb. 2, 2021

(54) INFORMATION PROCESSING APPARATUS USING MULTI-LAYER NEURAL NETWORK AND METHOD THEREFOR

(71) Applicant: CANON KABUSHIKI KAISHA, Tokyo (JP)

(72) Inventors: Yasuhiro Okuno, Tokyo (JP); Shunta Tate, Tokyo (JP); Yasuhiro Komori, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 758 days.

(21) Appl. No.: 15/603,241

(22) Filed: May 23, 2017

(65) Prior Publication Data

US 2017/0344881 A1 Nov. 30, 2017

(30) Foreign Application Priority Data

May 25, 2016 (JP) .................................. 2016-104025

(51) Int. Cl.
*G06N 3/04* (2006.01)
*G06N 3/08* (2006.01)
*G06K 9/62* (2006.01)

(52) U.S. Cl.
CPC ............. *G06N 3/08* (2013.01); *G06K 9/6273* (2013.01); *G06N 3/04* (2013.01); *G06N 3/0454* (2013.01); *G06K 9/6201* (2013.01)

(58) Field of Classification Search
None
See application file for complete search history.

(56) References Cited

U.S. PATENT DOCUMENTS

2014/0257805 A1 9/2014 Huang
2016/0140438 A1 5/2016 Yang

FOREIGN PATENT DOCUMENTS

JP 2014-229124 A 12/2014
WO 2016/026063 A1 2/2016

OTHER PUBLICATIONS

Dodge, Quality Resilient Deep Neural Networks, arxiv.org, 2017, pp. 1-9 (Year: 2017).*
Taylor, et al., Evolving Neural Network Topologies for Object Recognition, World Automation Congress (WAC) 2006, 2006, pp. 1-6 (Year: 2006).*
Rich Caruana, "Multitask Learning", Machine Learning, 28(1), 41-75 1997 Kluwer Academic Publishers.
(Continued)

*Primary Examiner* — Wilbert L Starks
(74) *Attorney, Agent, or Firm* — Canon U.S.A., Inc. IP Division

(57) ABSTRACT

An information processing apparatus includes a learning unit configured to learn a plurality of multi-layer neural networks configured to carry out a plurality of tasks, a generation unit configured to generate a shared layer candidate at a predetermined layer between or among the plurality of multi-layer neural networks, a first relearning unit configured to relearn the plurality of multi-layer neural networks in a structure using the shared layer candidate, and a determination unit configured to determine whether to share the shared layer candidate at the predetermined layer with respect to each of the plurality of tasks based on an evaluation of the relearning.

15 Claims, 12 Drawing Sheets

(56) References Cited

OTHER PUBLICATIONS

Max Jaderberg, et al., "Speeding up Convolutional Neural Networks with Low Rank Expansions", arXiv: 1405.3866v1, May 15, 2014.
Xiangyu Zhang et al., "Efficient and Accurate Approximations of Nonlinear Convolutional Networks", arXiv: 1411.4299v1, Nov. 16, 2014.

* cited by examiner

INFORMATION PROCESSING APPARATUS USING MULTI-LAYER NEURAL NETWORK AND METHOD THEREFOR

BACKGROUND

Field of the Disclosure

The present disclosure relates to an information processing apparatus using a multi-layer neural network and a method therefor.

Description of the Related Art

There is a technique for learning and recognizing a content of data such as an image and a sound. In the present disclosure, a purpose of recognition processing will be referred to as a recognition task. For example, examples of the recognition task include a face recognition task of detecting a region of a human face from an image, an object category recognition task of determining a category (e.g., a cat, a vehicle, a building) of an object (a subject) appearing in an image, and a scene type recognition task of determining a scene type (e.g., a city, a mountain area, and a beach,).

A neural network (hereinafter referred to as an "NN") is known as a technique for learning and carrying out the recognition task as in the above-described examples. A deep (meaning including many layers) multi-layer NN is called a deep NN (DNN). Especially, a deep convolutional NN is called a deep convolutional NN (DCNN). In recent years, the DCNN has attracted attention due to its high performance (a recognition accuracy and a recognition performance).

The DCNN has such a network structure that performs convolutional processing on an output from a preceding layer and outputs a result thereof to a next layer at each layer. A final layer serves as an output layer that indicates a recognition result. A plurality of filters (kernels) for a convolutional calculation is prepared for each layer. Generally, a layer close to the output layer is structured so as not to have a convolutional connection but to have a full connection like the normal NN. In the following description, the filter for the convolutional calculation will be referred to as a convolutional filter.

In a learning phase of the DCNN, a value of the convolutional filter and a connection weight of the fully connected layer (they will be collectively referred to as a "learning parameter") are learned from supervised data with use of a method, such as the backward propagation of errors (backpropagation: BP).

In a recognition phase of the DCNN, data is input to the learned DCNN and is sequentially processed according to the learned learning parameter at each layer, and the recognition result is acquired from the output layer.

There is such a method that learns and carries out a plurality of recognition tasks with use of a single learning unit (a learner), which is called multi-task learning. For example, "Multitask Learning" written by R. Caruana (1997) in Machine Learning 28(1), 41 to 75 discusses a method that learns a plurality of recognition tasks with use of a single multi-layer NN provided with a plurality of output units for the plurality of recognition tasks. "Multitask Learning" written by R. Caruana (1997) in Machine Learning 28(1), 41 to 75 discusses that any recognition task uses a same layer at an intermediate layer, and the intermediate layer is trained with data about all of the recognition tasks.

The plurality of recognition tasks handled in the multi-task learning discussed in the above-described literature is assumed to have a certain degree of similarity in the content of the recognition processing. This literature indicates that learning the similar recognition tasks with use of the single learner may allow the recognition tasks to be learned while mutually using common knowledge contained in the data about each of the recognition tasks between or among them, thereby improving the recognition performance. In a case of recognition tasks having few commonalities between or among them, learning them simultaneously with use of the single learner may undesirably result in a lower recognition performance than learning them separately. Whether the recognition performance is degraded cannot be figured out until the learning and an evaluation are actually carried out.

In a DCNN that learns the recognition task of recognizing an image, parameters similar to some extent are learned as learning parameters learned at layers close to an input regardless of a difference between or among the recognition tasks (a difference in a recognition result to be desired to be finally output). In other words, the performance may be not degraded so much even if the learned parameters are used after being interchanged with each other or one another between or among different recognition tasks. For example, the performance may be little degraded at the layer close to the input but largely degraded at the layer close to the output if the learning parameters are interchanged with each other between two different recognition tasks.

The multi-task learning discussed in the above-described literature allows the recognition tasks to be learned while mutually using the common knowledge contained in the data about the recognition tasks between or among them, but whether the performance is degraded by this common use cannot be figured out until the learning and the evaluation are actually carried out. In other words, a thorough (exhaustive) search should be conducted to search for an optimum NN structure. However, the DCNN takes a long time for the learning, so that it is difficult to thoroughly search for the optimum NN structure.

The multi-task learning uses a significantly large number of learning parameters, and therefore requires a large-capacity memory for holding the large number of learning parameters when the recognition processing is performed (the recognition phase).

The multi-task learning performs the convolutional calculation processing a large number of times with use of the learning parameters, and therefore takes a long processing time in the recognition phase.

A plurality of recognition tasks may be desired to be carried out simultaneously on the same image data under a single calculation environment (e.g., a personal computer (PC)). For example, in a case where the face recognition, the scene type recognition, a region segmentation, and a determination about whether a composition is appropriate are carried out and results thereof are used for auto-focus, auto-exposure, and composition guidance every time a user captures an image with a camera, this leads to the simultaneous execution of the plurality of recognition tasks. The simultaneous execution of the plurality of recognition tasks raises a necessity of the learning parameters each individually learned for each of the recognition tasks, further making the issues bigger in performing the recognition processing (e.g., the length of the learning time period, and the large-capacity memory).

SUMMARY

According to an aspect of the present disclosure, an information processing apparatus includes a learning unit configured to learn a plurality of multi-layer neural networks configured to carry out a plurality of tasks, a generation unit configured to generate a shared layer candidate at a predetermined layer between or among the plurality of multi-layer neural networks, a first relearning unit configured to relearn the plurality of multi-layer neural networks in a structure using the shared layer candidate, and a determination unit configured to determine whether the shared layer candidate is to be shared at the predetermined layer with respect to each of the plurality of tasks based on an evaluation of the relearning.

Further features of the present disclosure will become apparent from the following description of exemplary embodiments with reference to the attached drawings.

DESCRIPTION OF THE EMBODIMENTS

Figure 1:
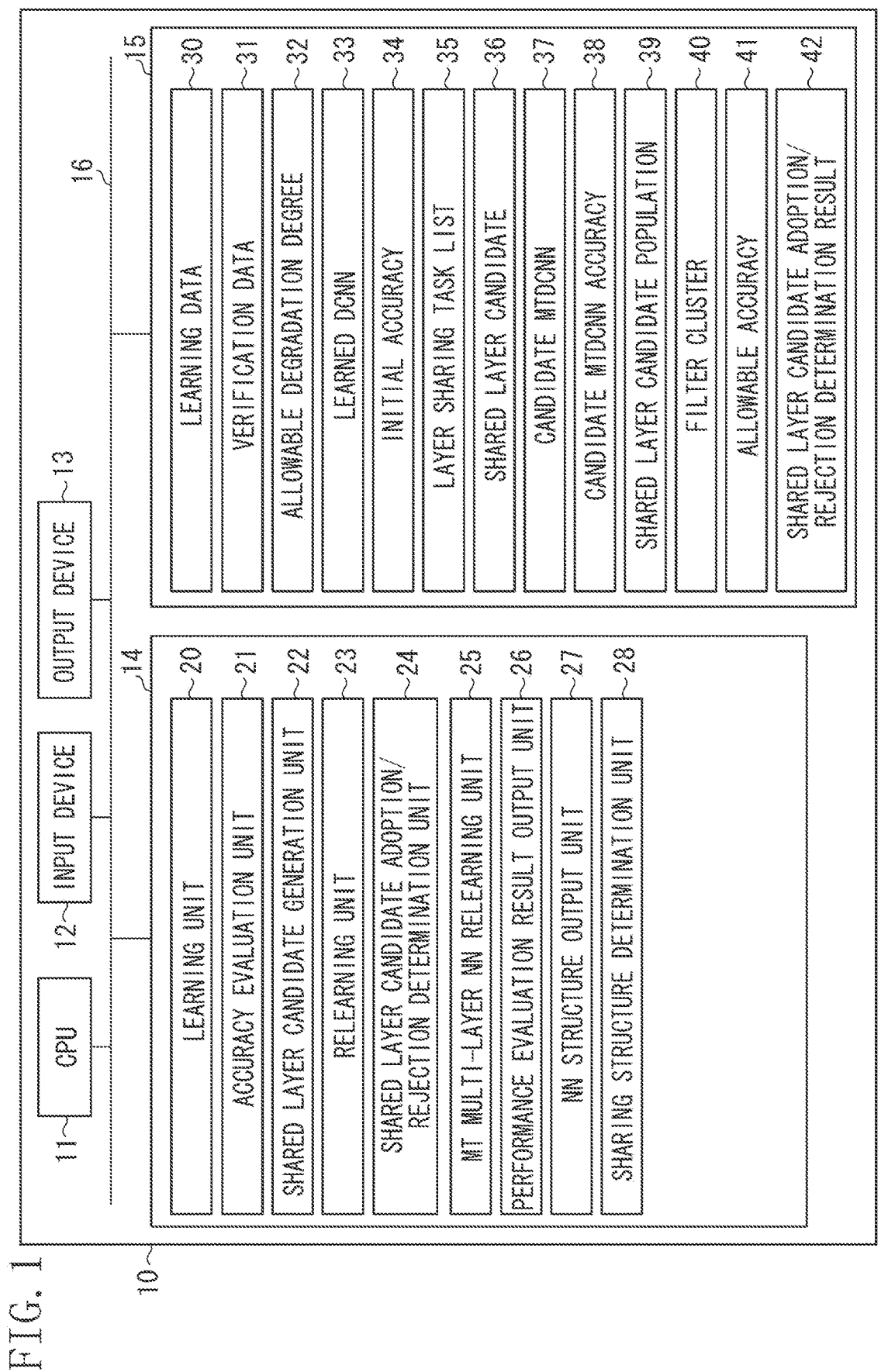
FIG. 1 illustrates a configuration of a learning apparatus according to one or more aspects of the present disclosure.

In the following description, exemplary embodiments of the present disclosure will be described. The exemplary embodiments that will be described below are merely one example as how the present disclosure can be realized, and shall be appropriately modified or changed depending on a configuration of an apparatus and various kinds of conditions to which the present disclosure is applied. Thus, the present disclosure is in no way limited to the following exemplary embodiments.

Outline of Exemplary Embodiments

As described in the description of the related art, the deep convolutional NN (DCNN) has the issues of making it difficult to thoroughly search for the optimum (desirable) network structure, requiring the large-capacity memory for holding a large number of learning parameters, and taking a long processing time in the recognition phase. One possible solution to mitigate or solve these issues is to reduce the number of learning parameters required when the recognition task is carried out.

Performing a plurality of recognition processes with independent DCNNs that each carry out a single recognition task requires an inconvenient necessity for providing each of the DCNNs with the number of learning parameters sufficient to maintain the recognition performance of the corresponding recognition task. However, between or among similar recognition tasks, there is a possibility that the learning parameter at a layer close to an input can be shared between or among the recognition tasks while the performance is maintained. More specifically, the sharing of the learning parameter can be realized by constructing such a structure of the DCNN that shares the learning parameter between or among the recognition tasks at several layers close to the input, and branches into layers having different learning parameters for each of the recognition tasks in higher layers than those layers close to the input, to finally have an output unit (output layer) for each of the recognition tasks. Then, this can be realized by learning this structure of the DCNN with use of data of the plurality of recognition tasks. In the present disclosure, such a structure of the DCNN will be referred to as a multi-task DCNN (MTDCNN) structure. The MT is an abbreviation for multi-task.

Employing the multi-task DCNN structure leads to shared use of the learned parameter and a result of a calculation using this parameter between or among the plurality of recognition tasks at the layers close to the input, which reduces the memory capacity and the calculation time period required at the time of the recognition processing. However, it is impossible to figure out which recognition tasks of the plurality of recognition tasks should share the learning parameter between or among them and up to which layer the learning parameter should be shared to attain the most desirable multi-task DCNN structure, until the learning processing is performed and the performance is evaluated actually.

Considering the number of variations of such a structure of the multi-task DCNN that shares the layer close to the input between or among the plurality of recognition tasks, the number of variations thereof is enormous because there are variations derived from up to what number layer the sharing continues with respect to each of all of possible combinations of the plurality of recognition tasks. As described above, the learning of the DCNN generally takes a long time. Accordingly, it takes a tremendous time with a method in which the desirable multi-task DCNN structure is determined by actually performing the learning processing and evaluating the performance with respect to all of the variations of the structure of the multi-task DCNN.

In the exemplary embodiments that will be described below, a learning apparatus capable of solving or mitigating the above-described issues will be described. This learning apparatus generates a limited number of shared layer candidates, and determines the desirable structure of the multi-task DCNN with use of these shared layer candidates. This learning apparatus can also be referred to as a multi-task multi-layer neural network (NN) learning apparatus. This learning apparatus can also be referred to as an information processing apparatus because the recognition processing can also be performed with use of this learning apparatus.

(Configuration of Learning Apparatus)

FIG. 1 is a block diagram illustrating a configuration of a learning apparatus 10 according to a first exemplary embodiment. The learning apparatus 10 includes a central processing unit (CPU) 11, an input device 12, an output device 13, a first memory 14, and a second memory 15. The CPU 11, the input device 12, the output device 13, the first memory 14, and the second memory 15 are connected to one another via a calculator bus 16.

The CPU 11 controls operations of the input device 12, the output device 13, the first memory 14, and the second memory 15. For example, the CPU 11 performs predetermined processing by executing a function of the first memory 14 (a program stored in the first memory 14) with use of data stored in the second memory 15.

The input device 12 is, for example, a mouse and/or a keyboard. A user of the learning apparatus 10 can input desired data and a desired instruction to the first memory 14 and the second memory 15 with the input device 12. The output device 13 is, for example, a liquid crystal display and/or a printer. The output device 13 may include an audio output unit.

The first memory 14 includes a learning unit 20, an accuracy evaluation unit 21, a shared layer candidate generation unit 22, a relearning unit 23, a shared layer candidate adoption/rejection determination unit 24, a multi-task multi-layer NN relearning unit 25, a performance evaluation result output unit 26, an NN structure output unit 27, and a sharing structure determination unit 28. In FIG. 1, each of the units in the first memory 14 is illustrated as a functional block.

The learning unit 20 is a learner of the DCNN, and a conventionally known learner can be used therefor.

The accuracy evaluation unit 21 evaluates accuracy regarding each recognition task. More specifically, the accuracy evaluation unit 21 calculates accuracy defined for each type of recognition task. For example, if the recognition task is the scene type recognition task, the accuracy evaluation unit 21 calculates an accuracy rate (accuracy) or the like. If the recognition task is the task of detecting a position of a face, the accuracy evaluation unit 21 calculates, for example, a Euclidean distance of an error of an estimated position on image coordinates. In the present exemplary embodiment, for simplicity of the description, assume that a method for calculating the accuracy of each recognition task is defined in such a manner that the recognition performance increases as a value of the accuracy increases.

The shared layer candidate generation unit 22 generates a shared layer candidate at an i-th layer, and stores the generated data into the second memory 15 as a shared layer candidate 36.

The relearning unit 23 has a learning function similar to the learning unit 20, but has a different learning setting. The relearning unit 23 learns about a recognition task in a candidate multi-task DCNN 37 that is recorded in a layer sharing task list 35 (which will be described below). The candidate multi-task DCNN 37 is a multi-task DCNN structure having such a structure that the shared layer candidate 36 is shared at the i-th layer of the recognition task recorded in the layer sharing task list 35.

The shared layer candidate adoption/rejection determination unit 24 determines whether to adopt a shared layer candidate SLi for each recognition task.

The multi-task multi-layer NN relearning unit 25 relearns a finally determined multi-task multi-layer NN (an entire learned DCNN 33).

The performance evaluation result output unit 26 displays an accuracy evaluation value of each recognition task that is calculated with the accuracy evaluation unit 21 on the output device 13.

The NN structure output unit 27 displays a structure of the DCNN (e.g., a sharing structure diagram illustrated in FIG. 10) on the output device 13.

The sharing structure determination unit 28 determines the multi-task DCNN structure based on a result of the determination about whether to adopt the shared layer candidate.

The second memory 15 holds (stores) learning data 30, verification data 31, an allowance degradation degree 32, the learned DCNN 33, an initial accuracy 34, the layer sharing task list 35, and the shared layer candidate 36. Further, the second memory 15 holds the candidate multi-task DCNN 37, a candidate multi-task DCNN accuracy 38, a shared layer candidate population 39, a filter cluster 40, an allowable accuracy 41, and a shared layer candidate adoption/rejection determination result 42.

The learning data 30 is assumed to be stored in the second memory 15 in advance. In the present exemplary embodiment, the learning apparatus 10 will be described assuming that data targeted for the recognition is an image, but data such as a sound and a character string may be targeted for the recognition. A large number of sets of image data (learning images) and supervised data (ground truth (GT), true value) corresponding thereto are stored in the learning data 30. In other words, storing a predetermined number of sets (pairs) of image data and supervised data is the format of the learning data 30. In the present exemplary embodiment, assume that there is a plurality of recognition tasks, and GTs of the plurality of recognition tasks are associated with a single piece of image data. More specifically, this association can be prepared by expressing this association as a text file such as a table in which a filename of the image and the GTs of the plurality of recognition tasks are enumerated. The GT can be expressed by, for example, setting an identification (ID) (an integer value) indicating a scene type that is the answer as the GT in the case of the scene type recognition task, and setting a two-dimensional image coordinate value (a two-dimensional real value) indicating a position of a face as the GT in the case where the position of the face is acquired as the answer in the face recognition task.

Not the GTs of all of the recognition tasks have to be associated with the single pieces of image data. For example, only a GT of a single recognition task may be associated with some image, and GTs of the other recognition tasks may be blank. In this case, in learning some recognition task alone, the learning apparatus 10 can carry out the learning only with the learning data in which the GT of this recognition task is written for the leaning and verification. In simultaneously carrying out the multi-task learning in which the plurality of recognition tasks is learnt, the learning apparatus 10 may use only leaning data to which the GTs of all of the recognition tasks contained in the multi-task (the plurality of recognition tasks) correspond. Alternatively, the learning apparatus 10 may use learning data to which a GT or GTs of one or more recognition task(s) correspond(s). In learning in the latter case, for example, the learning apparatus 10 learns by calculating an error only from an output unit where the GT is associated with the data to be used in the learning, and carrying out the backpropagation.

The verification data (data for verification) 31 is assumed to be stored in the second memory 15 in advance. The verification data 31 is data (an image) for verifying the performance of the learned DCNN. The verification data 31 has a data content that does not overlap the learning data 30. The format (the structure) of the verification data 31 is similar to the format of the learning data 30. In other words, in the present exemplary embodiment, the verification data 31 contains the image and the GT of each of the recognition tasks. The verification data 31 can also be referred to as validation data or collation data.

The allowable degradation degree 32 is an allowable degree of degradation regarding each of the recognition tasks, and is assumed to be set by the user via the input device 12 and stored in the second memory 15 in advance. The allowable degradation degree 32 is a value indicating, compared with an accuracy of a single-task DCNN that has learned some recognition task individually, how much degradation is allowable regarding the accuracy of the multi-task DCNN (its recognition task therein) that shares a learning parameter at a lower layer portion with another recognition task. In the present exemplary embodiment, the allowable degradation degree 32 is set to a real value of 0.0 or larger and 1.0 or smaller as a ratio of the accuracy of the multi-task DCNN to the accuracy of the single-task DCNN for each of the recognition tasks. This real value is set by the user in advance. In other words, an allowable limit of the accuracy requested by the user is expressed and set as the allowable degradation degree 32.

The allowable limit of the accuracy requested by the user does not necessarily have to be expressed and set as the allowable degradation degree 32. For example, the allowable limit of the accuracy requested by the user may be specified with use of an absolute value of the accuracy evaluation value calculated by the accuracy evaluation unit (allowable accuracy value). In this case, the determination by the shared layer candidate adoption/rejection determination unit 24 is not based on the value calculated by multiplying the accuracy of the single-task DCNN by the allowable degradation degree 32 but based on the allowable accuracy value specified with use of the absolute value.

The learned DCNN 33 is the DCNN learned by, for example, the backpropagation. The initial accuracy 34 is the accuracy of each of the recognition tasks in the DCNN having a learned initial structure. A list of IDs of recognition tasks that may share the layer at the i-the layer is written (recorded) in the layer sharing task list 35. The shared layer candidate 36 is the shared layer candidate at the i-th layer that is generated by the shared layer candidate generation unit 22.

The candidate multi-task DCNN 37 is a multi-task DCNN having such a structure that the i-th layer of the recognition task recorded in the layer sharing task list 35 is shared by the shared layer candidate 36. The candidate multi-task DCNN accuracy 38 is an accuracy of each of the recognition tasks in the relearned candidate multi-task DCNN. The shared layer candidate population 39 is a group of all convolutional filters contained in the i-th layers of all of the recognition tasks recorded in the layer sharing task list 35. The shared layer candidate population 39 divided into a predetermined number of clusters by clustering is stored in the filter cluster 40. The allowable accuracy 41 is an allowable accuracy regarding the recognition task. The shared layer candidate adoption/rejection determination result 42 is a result of determining whether to adopt the shared layer candidate SLi for each of the recognition tasks.

Each of the units (each of the functional blocks) illustrated in the first memory 14 is stored in the first memory 14 as a program, and is executed by the CPU 11.

(Hardware Configuration)

At least a part of the functional blocks illustrated in FIG. 1 may be realized by hardware. In the case where at least a part of the functional blocks illustrated in FIG. 1 is realized by hardware, for example, the use of a predetermined compiler, for example, can automatically generate a dedicated circuit on a field-programmable gate array (FPGA) from a program for realizing each step. Alternatively, the learning apparatus 10 may be configured in such a manner that at least a part of the functional blocks illustrated in FIG. 1 is realized as hardware by forming a gate array circuit in a manner similar to the FPGA. Alternatively, the learning apparatus 10 may be configured in such a manner that at least a part of the functional blocks illustrated in FIG. 1 is realized by an application specific integrated circuit (ASIC).

The first memory 14 and the second memory 15 are indicated only to distinguish the memory storing the program and the memory storing the data, respectively, and may be prepared as a single memory.

(Initial Structure of Multi-Task DCNN)

The learning apparatus 10 according to the present exemplary embodiment eventually determines such a single multi-task DCNN structure that is desirable (or optimum) for the plurality of recognition tasks from the multi-task DCNN having the initial structure. First, the initial structure of the multi-task DCNN will be described with reference to FIG. 2.

Figure 2:
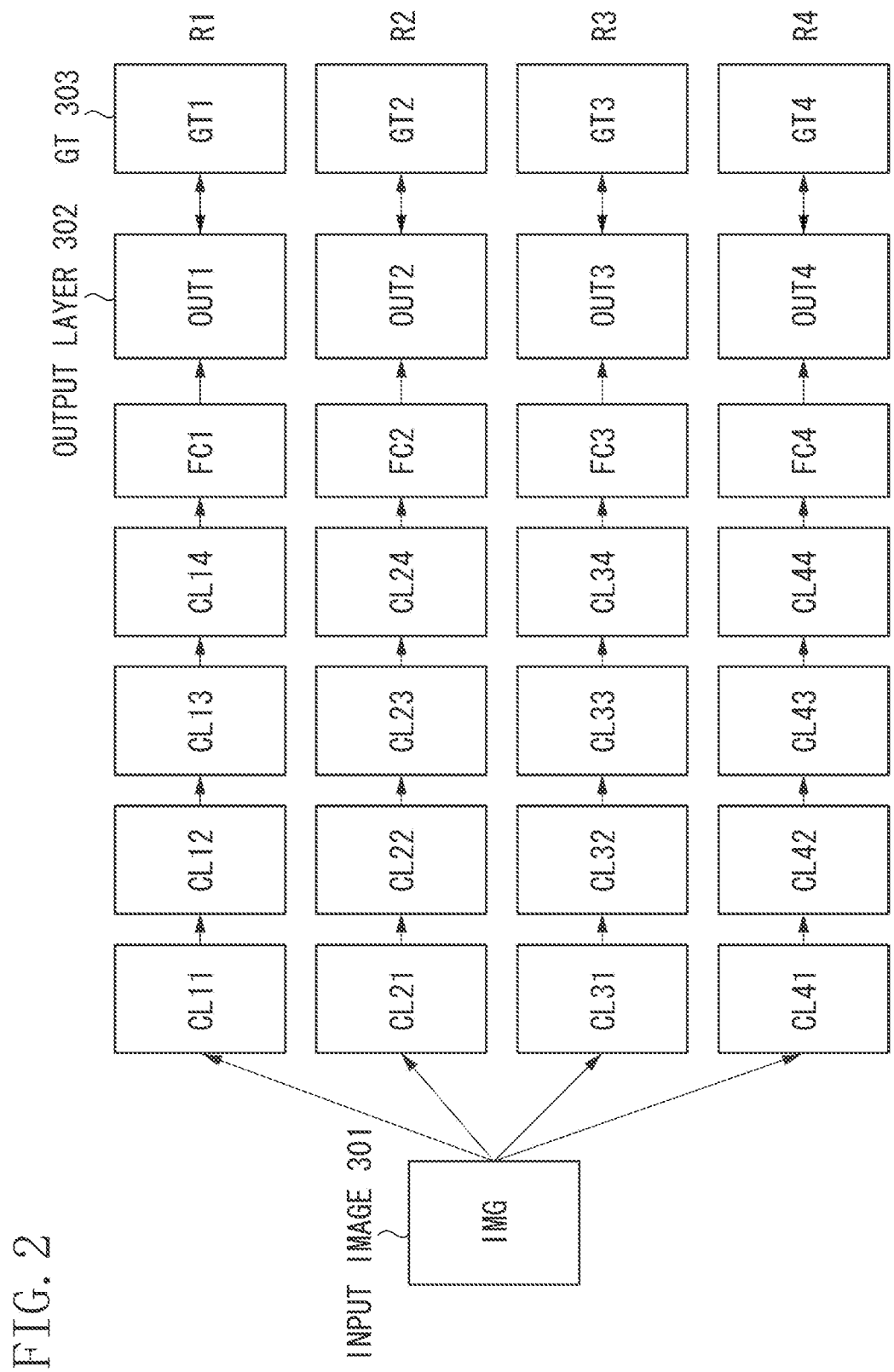
FIG. 2 illustrates an initial structure of a multi-task multi-layer neural network (NN).

FIG. 2 illustrates the DCNN structure configured to learn the plurality of recognition tasks individually. Assume that N represents the number of recognition tasks to be processed by this DCNN structure. In FIG. 2, this number is N=4.

In the DCNN structure (the initial structure) illustrated in FIG. 2, an NN (neural network) of each of the recognition tasks has its own layer (the learning parameter) at all layers, and there is no intermediate layer shared among them. Learning in the DCNN structure illustrated in FIG. 2 is practically equivalent to learning each of the recognition tasks in independent distinct DCNNs.

To facilitate the understanding, FIG. 2 illustrates the DCNN structure as if the plurality of recognition tasks is connected at an input image 301 to form a single network, but, actually, independent single-task learning is carried out for each of the recognition tasks. In other words, the configuration would be the same even if a block indicating the input image 301 is illustrated as being divided for each of the recognition tasks and this DCNN structure is expressed as a plurality of DCNNs, four independent DCNNs. In FIG. 2, the image is labeled IMG.

The present processing may also be applied under such a situation that there is already a plurality of DCNNs learned independently of one another, and one desirable multi-task DCNN structure is generated therefrom.

The plurality of practically independent DCNN initial structures illustrated in FIG. 2 is being optimized (made desirable) into one desirable multi-task DCNN structure through an overall processing according to the present exemplary embodiment (FIG. 3), which will be described below. This multi-task DCNN structure is a DCNN structure that can carry out the plurality of recognition tasks, and has intermediate layers partially shared among the recognition tasks.

FIG. 2 illustrates an example during the learning phase. More specifically, FIG. 2 illustrates the example when a GT 303 is provided and learned as a supervised value subsequently to an output layer 302. In a case where the evaluation processing or the recognition processing is performed, the intended result can be acquired by not providing the GT 303 and directly using a value of the output layer 302 as a recognition result. This means that, if the recognition processing is performed by the multi-task multi-layer neural network learned by the learning apparatus 10, the learning apparatus 10 functions as a recognition processing apparatus.

In the present exemplary embodiment, assume that M represents the number of convolutional layers in the DCNN to be learned. In FIG. 2, this number is M=4. The value of M may be different for each of the recognition tasks, but, in the present exemplary embodiment, the learning apparatus 10 will be described assuming that the learning apparatus 10 learns the DCNN of the M layers that is consistent among all of the N types of recognition tasks for simplicity of the description.

Further, assume that several layers according to the fully connected NN follow subsequently to the M convolutional layers. The fully connected layer is labeled FC (FC: fully connected) in FIG. 2. There may be a plurality of fully connected layers. In FIG. 2, the fully connected layers are collectively indicated as one block regardless of how many layers exist as the fully connected layers.

The structure illustrated in FIG. 2 includes recognition task types R1, R2, R3, and R4, and an index T when the recognition task is expressed as $R_T$ indicates an ID number (1 to N) of the recognition task. In the present exemplary embodiment, this number is N=4 as described above. $CL_{TL}$ will be used to represent the convolutional layer (CL: convolutional layer). A subscript T indicates the ID number of the recognition task, and L indicates a layer number (1 to M). As described above, in the present exemplary embodiment, this number is M=4, and the layer number increases in an order from a layer located closer to the input. Assume that all of the convolutional layers before the learning are each initialized with an appropriate value.

Assume that the number of convolutional filters at each of the layers of each of the recognition tasks is set in advance. The number of convolutional filters may be different for each of the recognition task types. In the following description, $NCL_{TL}$ will be used to represent the number of convolutional filters at each of the layers of each of the recognition tasks. The meanings of subscripts T and L are the same as above.

(Processing by Learning Apparatus)

Next, processing performed by the learning apparatus 10 according to the present exemplary embodiment will be described with reference to a flowchart illustrated in FIG. 3.

First, in step S1, the learning apparatus 10 learns the DCNN having the initial structure illustrated in FIG. 2 with use of the learning unit 20, and stores the learned DCNN into the second memory 15 as the learned DCNN 33.

As described above, FIG. 2 illustrates the DCNN during the learning phase (at the time of the learning). The learning data 30 stored in the second memory 15 is used as the input image 301 and the GT 303 of each of the recognition tasks illustrated in FIG. 2. The input image 301 is the learning image, and $GT_T$ is the GT data corresponding to a T-th task. As described above, not the GTs of all of the recognition tasks necessarily have to be associated with all of the learning images.

In the following description, $CL_{TL}[j]$ will be used to represent the learned layer $CL_{TL}$. The number j represents the cumulative number of times of learning that this layer is learned again. All of the layers of all of the recognition tasks are in a state that they are learned once in step S1, and are thus expressed as $CL_{TL}[1]$.

In step S2, the learning apparatus 10 individually calculates the accuracy of each of the recognition tasks in the DCNN having the initial structure learned in step S1 with use of the accuracy evaluation unit 21 in the first memory 14, and stores the calculated accuracy into the second memory 15 as the initial accuracy 34. The accuracy evaluation unit 21 can achieve this calculation only by calculating the accuracy of the learned DCNN 33 with use of the verification data 31 in the second memory 15. As described above, the definition of the accuracy calculation is defined for each of the recognition tasks.

Figure 4:
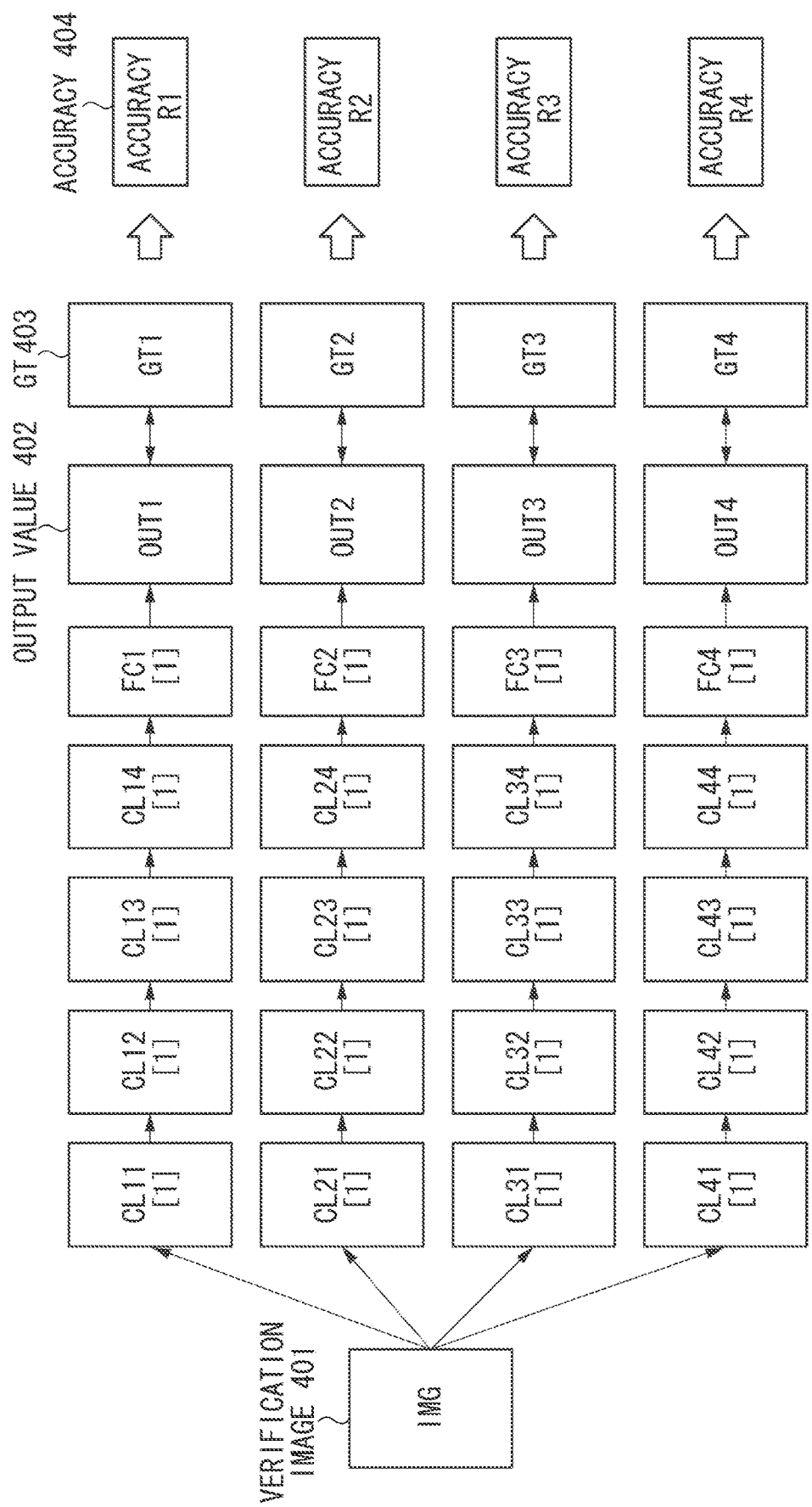
FIG. 4 illustrates processing performed by an accuracy evaluation unit on the multi-task deep convolutional neural network (DCNN) having the initial structure according to one or more aspects of the present disclosure.

FIG. 4 illustrates details of the processing performed by the accuracy evaluation unit 21 on the multi-task DCNN having the initial structure in step S2. The learned DCNN 33, the accuracy of which is calculated (i.e., the accuracy of which is evaluated) in step S2, is expressed as $CL_{TL}[1]$ since being in the state learned once at all of the layers of all of the recognition tasks in step S1. The accuracy evaluation unit 21 reads out the image from the verification data 31 in the second memory 15, inputs this image to the learned DCNN 33 as a verification image 401, and performs the recognition processing. The accuracy evaluation unit 21 then compares an output value 402 appearing at an output layer $OUT_T$ of each of the recognition tasks with a GT 403 of each of the recognition tasks read out from the verification data 31, and calculates an accuracy 404 of each of the recognition tasks. In FIG. 4, the accuracies 404 of the recognition tasks R1 to R4 are indicated as accuracies R1 to R4, respectively.

Referring back to FIG. 3, in step S3 and steps subsequent thereto, the learning apparatus 10 repeats processing for generating the shared layer candidate and processing for determining whether to adopt this shared layer candidate for each of the recognition tasks.

In step S3, the learning apparatus 10 initializes an index i (a loop index) indicating the layer targeted for the sharing to 1. The learning apparatus 10 initializes the layer sharing task list 35 in the second memory 15 as a memory (a storage unit) storing the list of IDs of recognition tasks that may share the layer at the i-th layer. In an initial state, all of the recognition tasks may be able to share the layer, and thus, the IDs of all of the recognition tasks are recorded in the layer sharing task list 35 in advance.

In step S4, the learning apparatus 10 generates the shared layer candidate at the i-th layer by the shared layer candidate generation unit 22, and stores the generated data into the second memory 15 as the shared layer candidate 36. SLi will be used to represent the shared layer candidate at the i-th layer. The SL is an abbreviation for the shared layer.

An overview of the processing performed by the shared layer candidate generation unit 22 is as follows (for details thereof, refer to FIG. 5). Assume that all of convolutional filters contained in predetermined layers (the i-th layers in the present example) of all of the recognition tasks recorded in the layer sharing task list 35 will be referred to as a shared layer candidate population. The shared layer candidate generation unit 22 generates the shared layer candidate by extracting (selecting) a representative convolutional filter from the shared layer candidate population. The contents of the convolutional filters contained in the convolutional layers may be similar among the DCNNs of the plurality of recognition tasks, and may be even interchangeable with one another. Accordingly, if a representative filter is selected from the convolutional filters of the plurality of recognition tasks (the shared layer candidate population) and the selected layer is set as the shared layer candidate, the shared layer candidate can be expected to lead to little degradation of the accuracy even when being interchanged with a convolutional layer of some recognition task.

Figure 5:
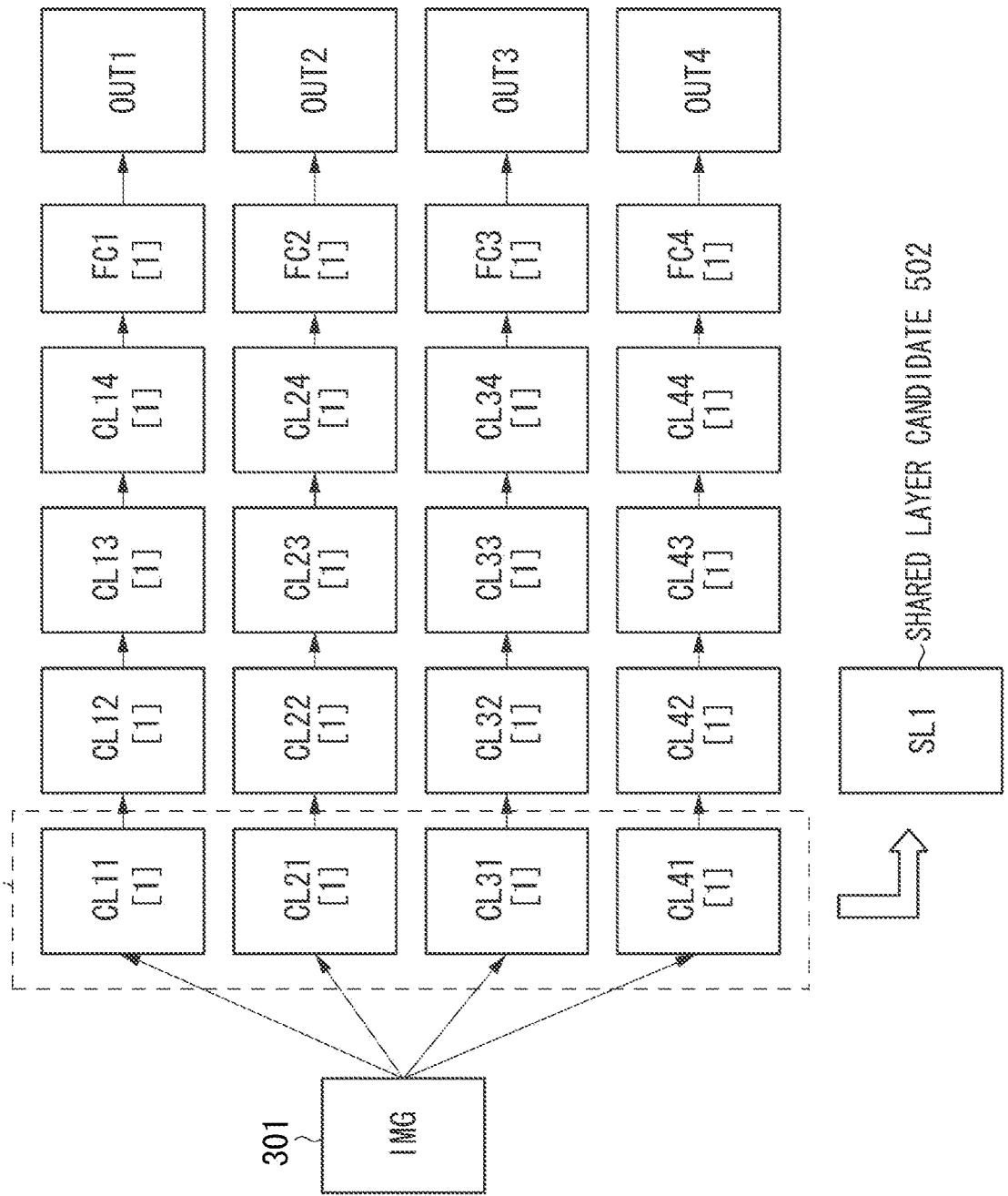
FIG. 5 illustrates processing performed by a shared layer candidate generation unit on a first layer according to one or more aspects of the present disclosure.

FIG. 5 illustrates the processing performed by the shared layer candidate generation unit 22. In FIG. 5, the shared layer candidate population is indicated as a group labeled 501. The shared layer candidate population 501 includes all of the convolutional filters contained in the entire i-th layers of all of the recognition tasks. A shared layer candidate 502 generated (calculated) by the shared layer candidate generation unit 22 from the shared layer candidate population 501 is labeled SLi in FIG. 5. An index i indicates the number of the layer ($1 \leq i \leq M$). In FIG. 5, SL1 indicates that this candidate is the shared layer candidate generated with respect to a first layer.

Referring back to FIG. 3, step S5 is performed subsequently to step S4. In step S5, the learning apparatus 10 generates the multi-task DCNN (MTDCNN) structure having such a structure that the shared layer candidate 36 (SLi) generated in step S4 is shared as the i-th layers of the recognition tasks recorded in the layer sharing task list 35. The generated multi-task DCNN structure is stored into the second memory 15 as the candidate multi-task DCNN 37.

Figure 6:
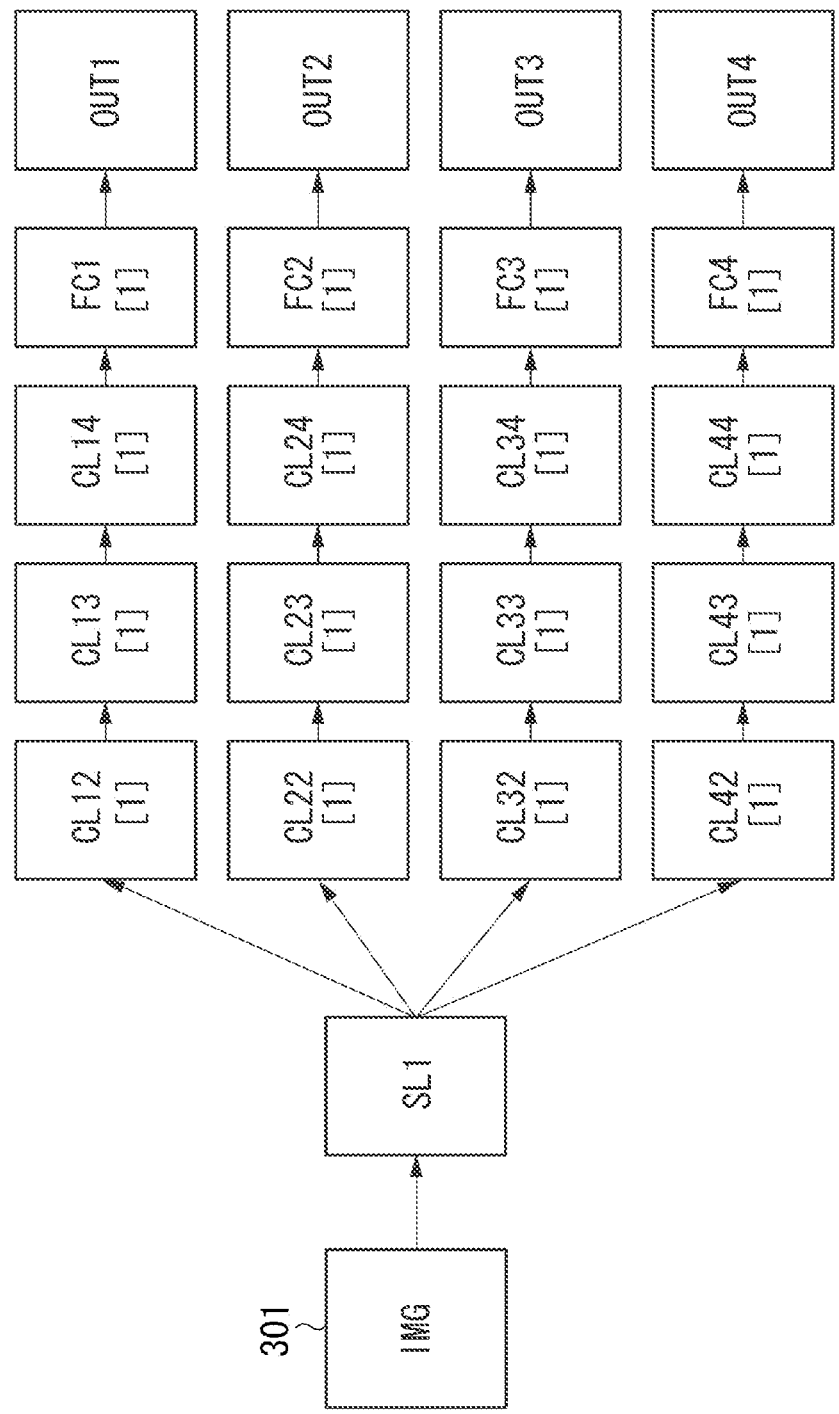
FIG. 6 illustrates a candidate multi-task DCNN according to one or more aspects of the present disclosure.
Figure 9:
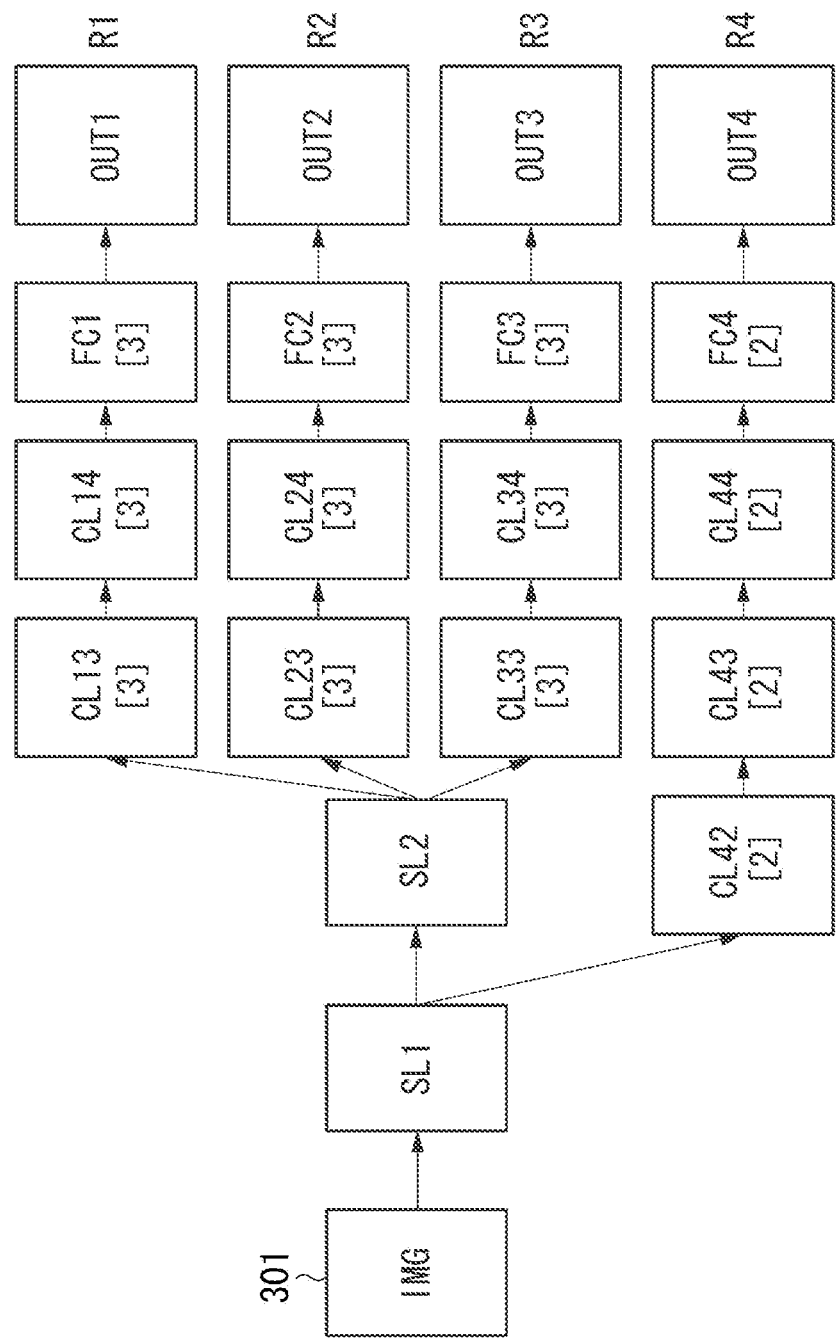
FIG. 9 illustrates a structure of the multi-task DCNN that is determined by a sharing structure determination unit according to one or more aspects of the present disclosure.

FIG. 6 illustrates the candidate multi-task DCNN 37 generated in step S5. In a case where i is equal to 1, all of the recognition tasks are recorded in the layer sharing task list 35, whereby such a structure that the shared layer candidate SL1 is shared as the first layers of all of the recognition tasks is generated as the candidate multi-task DCNN 37. In a case where i is i>1, the candidate multi-task DCNN 37 is structured so as to prohibit a recognition task that is not recorded in the layer sharing task list 35 (assume that t represents the task ID thereof) from sharing the shared layer candidate SLi, and cause the i-th layer or a higher layer (up to the FC layer) of this task t that has been relearned in an i-1-th loop to be used. Details of the processing in the case where not all of the recognition tasks are written (recorded) in the layer sharing task list 35 in a case where i is i>1 in this manner will be described below with use of processing at the time of a loop with i set to i=2 (FIG. 9).

In step S6, the learning apparatus 10 learns with respect to the recognition tasks, in the candidate multi-task DCNN 37, that are recorded in the layer sharing task list 35 by the relearning unit 23. The relearning unit 23 is similar to the learning unit 20 in terms of the learning function, but is different therefrom in terms of the learning setting. The relearning unit 23 relearns only an i+1-th layer and higher layers without updating the interchanged shared layer candidate SLi and lower layers. The relearning unit 23 can be set in this manner by, for example, setting zero as a learning rate regarding the lower layers than the shared layer candidate SLi and the layer of the recognition task that is not written (recorded) in the layer sharing task list 35 in a setting of the learning rate of the learning unit 20. In the loop with i set to i=1, all of the layers are learned in the structure illustrated in FIG. 2 first (the cumulative number of times of learning=1), and then a second layer and higher layers are relearned in step S6 subsequently (the cumulative number of times of learning=2), so that the second layer and the higher layers are expressed as $CL_{TL}[2]$ ($L \geq i+1$).

In step S7, the learning apparatus 10 calculates (evaluates) the accuracy of each of the recognition tasks in the relearned candidate multi-task DCNN 37 with use of the accuracy evaluation unit 21 in the first memory 14, and stores the calculated accuracy into the second memory 15 as the candidate multi-task DCNN accuracy 38.

Figure 7:
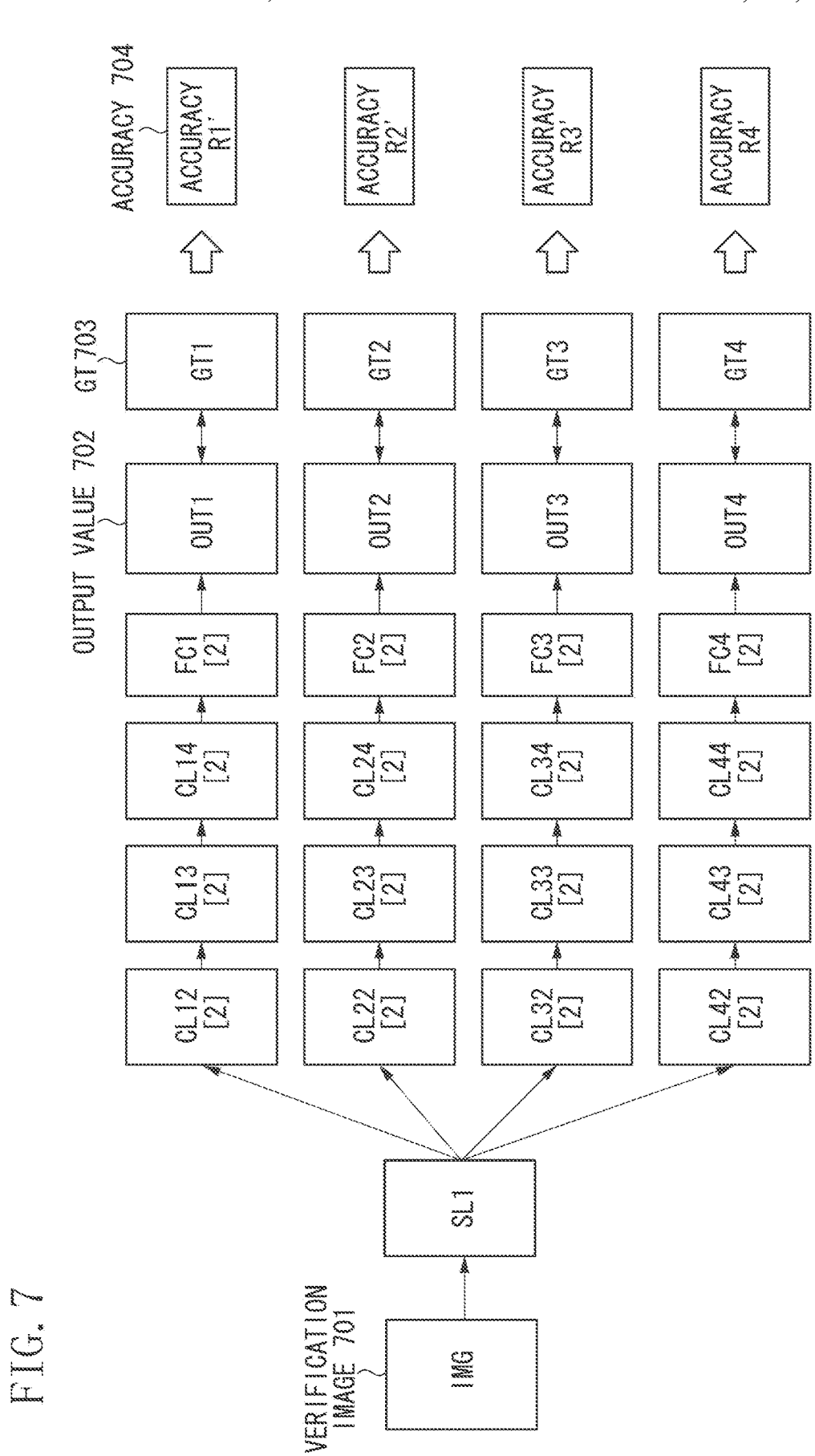
FIG. 7 illustrates processing performed by the accuracy evaluation unit on the candidate multi-task DCNN according to one or more aspects of the present disclosure.

FIG. 7 illustrates the processing performed by the accuracy evaluation unit 21 on the candidate multi-task DCNN in step S7. As in the description presented with reference to FIG. 4, the accuracy evaluation unit 21 reads out the image from the verification data 31 in the second memory 15 and performs the recognition processing with use of this image as a verification image 701. The accuracy evaluation unit 21 then compares an output value 702 appearing at the output layer $OUT_T$ of each of the recognition tasks with a GT 703 of each of the recognition tasks that is read out from the verification data 31, and calculates an accuracy 704 of each of the recognition tasks. In FIG. 7, the accuracies 704 respectively calculated with respect to the recognition tasks R1 to R4 are indicated as accuracies R1' to R4'.

At this time, the learning apparatus 10 may cause the accuracy (the performance) 704 of each of the recognition tasks that is calculated in step S7 to be displayed on the output device 13 with use of the performance evaluation result output unit 26 in the first memory 14 illustrated in FIG. 1. In other words, the performance evaluation result output unit 26 may cause the accuracy evaluation value (the accuracy 704 illustrated in FIG. 7) of each of the recognition tasks that is calculated with use of the accuracy evaluation unit 21 to be displayed on the output device 13.

Further, the learning apparatus 10 may also cause the structure of the DCNN evaluated in terms of the accuracy to be displayed on the output device 13 with use of the NN structure output unit 27 in the first memory 14 illustrated in FIG. 1. In other words, the NN structure output unit 27 may cause the structure of the DCNN to be displayed on the output device 13. For example, the learning apparatus 10 causes a final sharing structure diagram like the example illustrated in FIG. 10 to be output (displayed) on a display of the output device 13. The learning apparatus 10 can present the sharing structure diagram (a layer sharing state) to the user by causing the sharing structure diagram to be displayed on the display.

The learning apparatus 10 presents the accuracy for each of the recognition tasks and the layer sharing state to the user in this manner, which allows the user to understand which recognition tasks share the processing between or among them, how far the processing is shared, and what happens to the accuracy of each of the recognition tasks in this structure. Due to this understanding, the user can acquire a guideline for a manual adjustment, such as adjustments of the number of filters at each of the layers for each of the recognition tasks and the number of pieces of learning data.

Next, in step S8, the learning apparatus 10 determines whether to adopt the shared layer candidate SLi for each of the recognition tasks with use of the shared layer candidate adoption/rejection determination unit 24 in the first memory 14. Details of the processing performed by the shared layer candidate adoption/rejection determination unit 24 will be described below with reference to a flowchart illustrated in FIG. 12. A result of the determination made by the shared layer candidate adoption/rejection determination unit 24 is stored into the second memory 15 as the shared layer candidate adoption/rejection determination result 42. The task ID written in the shared layer candidate adoption/rejection determination result 42 (or this shared layer candidate SLi) is the task ID that adopts the shared layer candidate SLi.

In step S9, the learning apparatus 10 determines the multi-task DCNN structure based on a result of the determination in step S8 (the shared layer candidate adoption/rejection determination result 42) with use of the sharing structure determination unit 28 in the first memory 14, and overwrites the learned DCNN 33 with the determined DCNN structure. The sharing structure determination unit 28 determines the structure of the multi-task DCNN through the following method. The sharing structure determination unit 28 causes the recognition task $R_T$ determined to adopt the shared layer candidate in step S8 to share the shared layer candidate SLi at the i-th layer, and use $CL_{Tk}$ in the candidate multi-task DCNN 37 at a k-th layer that is the i+1-th layer or a higher layer (k≥i+1). The sharing structure determination unit 28 causes the recognition task $R_T$ determined not to adopt the shared layer in step S8 to use $CL_{Tj}$ in the learned DCNN 33 at a j-th layer that is the i-th layer or a higher layer (j≥i). This means that, in a case where there is a recognition task determined not to adopt the shared layer candidate, the structure of the multi-task DCNN branches at this layer. How this operation proceeds specifically will be described below with reference to FIGS. 9 and 10.

In step S10, the learning apparatus 10 updates the layer sharing task list 35 in the second memory 15 based on a result of the determination in step S8. In other words, the learning apparatus 10 deletes the ID of the recognition task determined not to adopt the shared layer candidate SLi from the layer sharing task list 35.

In step S11, the learning apparatus 10 determines whether there is no longer a recognition task that may share the layer by determining whether the processing has been completed with respect to all of the convolutional layers or whether the number of recognition tasks recorded in the layer sharing task list 35 reaches or falls below 1. In step S11 in FIG. 3, having no more recognition task that may share the layer is expressed as "completed". If there is no longer a recognition task that may share the layer (YES in step S11), the processing proceeds to step S13. In other words, if the determination in step S11 results in YES (YES in step S11), the processing exits the loop of steps S4 to S11 followed by a jump from step S12 to step S4, and proceeds to step S13. If there is left a recognition task that may share the layer (NO in step S11), the processing proceeds to step S12. In step S12, the learning apparatus 10 adds 1 to i, and the processing returns to step S4.

In step S13, the learning apparatus 10 relearns the learned DCNN 33 by the learning unit 20 (as in the learning unit 20) with use of the multi-task multi-layer NN relearning unit 25 in the first memory 14, and overwrites the learned DCNN 33 with the relearned DCNN to store the relearned DCNN. In other words, the multi-task multi-layer NN relearning unit 25 relearns the entire finally acquired learned DCNN 33 by the learning unit 20. The learning apparatus 10 relearns only the higher layers than the shared layer candidate SLi (the i+1-th layer) in step S6, but relearns the entire learned DCNN in step S13.

In a case where the multi-task multi-layer NN relearning unit 25 relearns, this relearning can be carried out by setting the parameter of the DCNN stored in the learned DCNN 33 when the processing exits the above-described loop as an initial value for the relearning.

In step S13, the learning apparatus 10 relearns the finally acquired learned DCNN 33 for the following reason.

The shared layer candidate SLi in the learned DCNN 33 that has been generated in the loop before the processing reaches step S13 is a collection of the representative convolutional filters from the layers $CL_{Ti}$ which has individually optimally learned each of the recognition tasks. Then, the lower layer portions of the DCNN which has individually learned the plurality of recognition tasks are interchangeable to some degree. The shared layer candidate SLi is a selection of the representative filters from the i-th layers of the plurality of recognition tasks, and therefore can be expected to contain the convolutional filter mostly suitable as the i-th layers of the plurality of recognition tasks. However, the shared layer candidate SLi is not a layer learned so as to be optimized for the learning data 30 in terms of the finally determined multi-task DCNN structure (in the finally determined multi-task DCNN structure). Therefore, the learning apparatus 10 learns again (relearns) the learned DCNN 33 entirely from the input to the output in step S13, thereby learning such a multi-task DCNN that the learning data 30 further matches the multi-task DCNN structure determined from the processing as far as step S10.

Further, using a result of the leaned DCNN 33 acquired in step S10 as the initial value for the relearning as described above can more stabilize the relearning than starting from a random initial value.

The learning apparatus 10 may evaluate the accuracy by the accuracy evaluation unit 21 with respect to the learned DCNN 33 acquired after the end of the relearning in step S13 (this may be referred to as a finally acquired learned DCNN). In addition, the learning apparatus 10 may cause a result of this accuracy evaluation to be displayed on the output device 13 by the performance evaluation result output unit 26 and the NN structure output unit 27. Presenting such a display allows the user to understand the accuracy and the sharing structure of the multi-task DCNN finally acquired by the learning apparatus 10. Presenting such a display also allows the user to acquire the guideline for the manual adjustment, such as an addition of data and a change in the number of convolutional filters.

The learning apparatus 10 may perform the processing by the multi-task multi-layer NN relearning unit 25, such as the process performed in step S13, even in the relearning processing in step S6 for each loop. To realize that, the learning apparatus 10 may include a third relearning unit different from the above-described two relearning units (23 and 25). Relearning for each loop leads to an increase in the number of times that the learning processing is performed, but can optimize (make desirable) the multi-task multi-layer NN for each loop and therefore can be expected to improve the accuracy of the learning. The learning time period (the number of times that the learning processing is performed) and the learning accuracy are in a trade-off relationship, so that which should be prioritized, the learning time period or the learning accuracy, is determined according to, for example, a given condition.

Upon an end of the relearning in step S13, the DCNN having the desirable sharing structure is stored into the learned DCNN 33 in the second memory 15 in the learned state, and the learning processing is ended.

(Structure of Multi-Task DCNN)

In the following description, what kind of structure is acquired as the multi-task DCNN structure determined by the repetition of the processing from steps S4 to S10 will be described specifically. This structure will be described with use of the following one example.

First, suppose that all of the recognition tasks R1 to R4 are determined to adopt the shared layer candidate (SLi) by the sharing structure determination unit 28 in step S9 based on the result of determining whether to adopt or reject the shared layer candidate in step S8 in the loop with i set to i=1.

The DCNN determined by the sharing structure determination unit 28 in step S9 in this case has a structure similar to FIG. 7. Accordingly, step S9 results in storage of a similar structure to the candidate multi-task DCNN 37 relearned in step S6 into the learned DCNN 33.

In this case, $CL_{Ti}$ (i≥2) at the second layer or a higher layer of each of the recognition tasks is the layer relearned in step S6, and the cumulative number of times of learning with respect to each CL is 2 as illustrated in FIG. 7.

In the loop with i set to i=2, in step S4, the shared layer candidate (SL2) with respect to the second layer is generated by the shared layer candidate generation unit 22.

Figure 8:
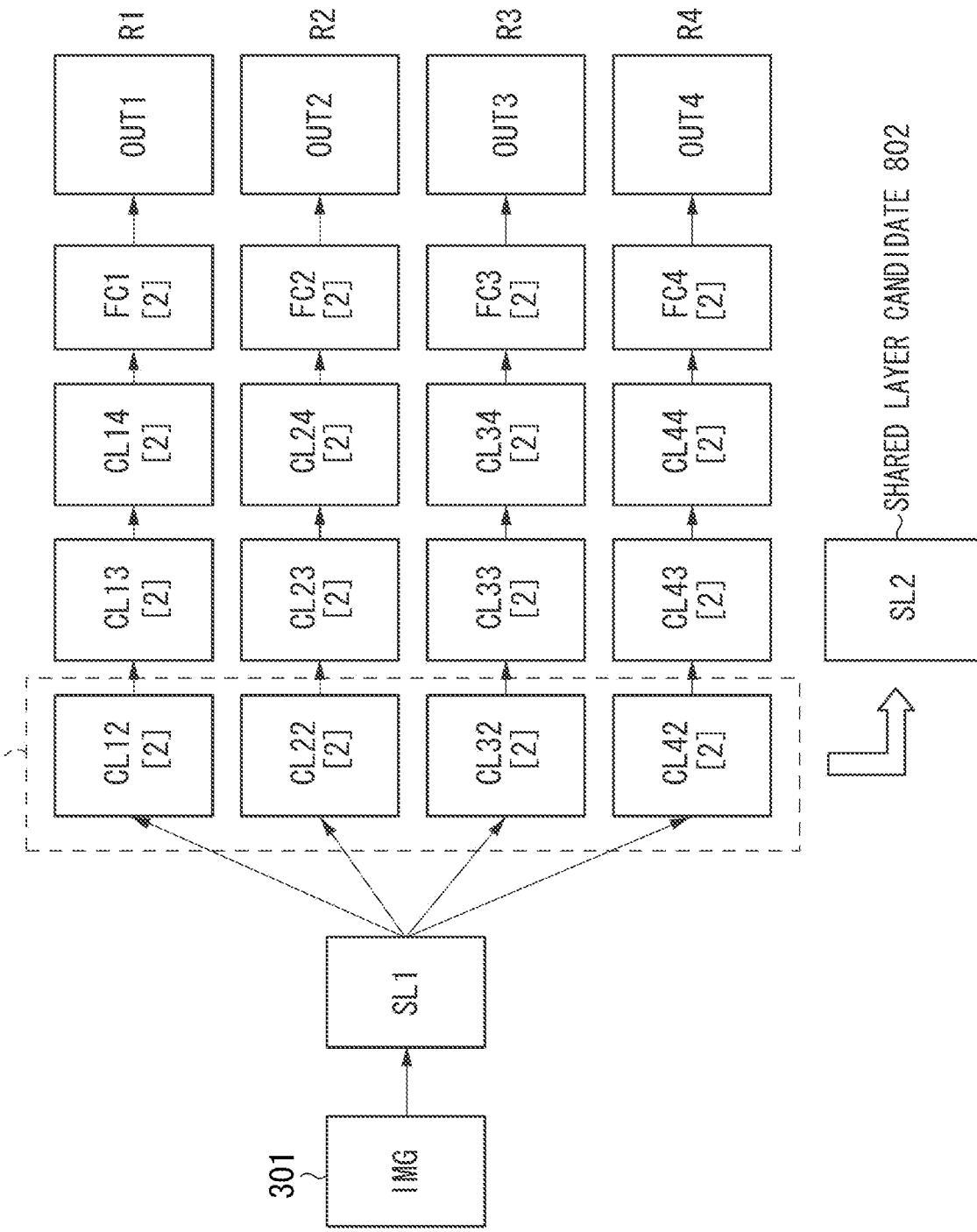
FIG. 8 illustrates processing performed by the shared layer candidate generation unit on a second layer according to one or more aspects of the present disclosure.

FIG. 8 illustrates how the shared layer candidate is generated. In this example, all of the recognition tasks are still written in the layer sharing task list 35, so that all of the convolutional filters contained in the second layer of each of the recognition tasks are stored in the shared layer candidate population 39. The representative convolutional filter is selected from this shared layer candidate population 39 by the shared layer candidate generation unit 22, and the shared layer candidate 36 is generated therefrom. As in the example illustrated in FIG. 5, a shared layer candidate 802 is also generated from a shared layer candidate population 801 in FIG. 8. Since i is i=2, the shared layer candidate 802 is labeled SL2 in FIG. 8.

In the present example, the operation of the sharing structure determination unit 28 in step S9 will be described with reference to FIG. 9, supposing that only the recognition task R4 is determined not to adopt the shared layer candidate SL2 in step S8 when i is i=2.

FIG. 9 illustrates the structure of the multi-task DCNN that is determined by the sharing structure determination unit 28 in step S9 in this case. The recognition task R4 is determined to share the layer with the other recognition tasks as far as the shared layer candidate SL1, but use $CL_{4k}$ (k≥2) in the learned DCNN 33 stored in the previous loop for the second layer or a higher layer ($CL_{4k}$, k≥2). In FIG. 9, an arrow extends from SL1 to CL42 regarding the recognition task R4. An arrow extends from SL1 to SL2 regarding the recognition tasks R1 to R3.

In other words, the learning apparatus 10 constructs such a multi-task DCNN structure that the second layer and the layers subsequent thereto for the recognition task R4 in the DCNN stored in the learned DCNN 33 are connected to the shared layer candidate SL1 in the candidate multi-task DCNN 37 relearned in step S6, with respect to the second layer and the layers subsequent thereto for the recognition task R4. The learning apparatus 10 overwrites the learned DCNN 33 with this constructed structure to store that. The shared layer candidate SL1 is the shared layer generated in the immediately preceding loop.

FIG. 9 indicates that the cumulative number of times of learning is 2 with respect to the second layer (CL42) and the layers subsequent thereto for the recognition task R4 determined not to share the shared layer candidate SL2, and these layers hold learning parameters learned in the previous loop. Layers $CL_{T2}$ and the layers subsequent thereto for the recognition tasks R1 to R3 hold learning parameters learned in the current loop, and the cumulative number of times of learning is 3 therefor.

The ID of the recognition task R4 is deleted from the layer sharing task list 35 in step S10, and therefore the recognition task R4 is not targeted for the relearning in loops subsequent thereto (steps S4 to S11 followed by the jump from step S12 to step S4). Accordingly, the recognition task R4 is only relearned in step S13 after the processing exits the loop.

The processing if the recognition task R3 is determined not to adopt the shared layer candidate SL3 in step S8 in the next loop (a loop with i set to i=3) will be described with reference to FIG. 10.

Figure 10:
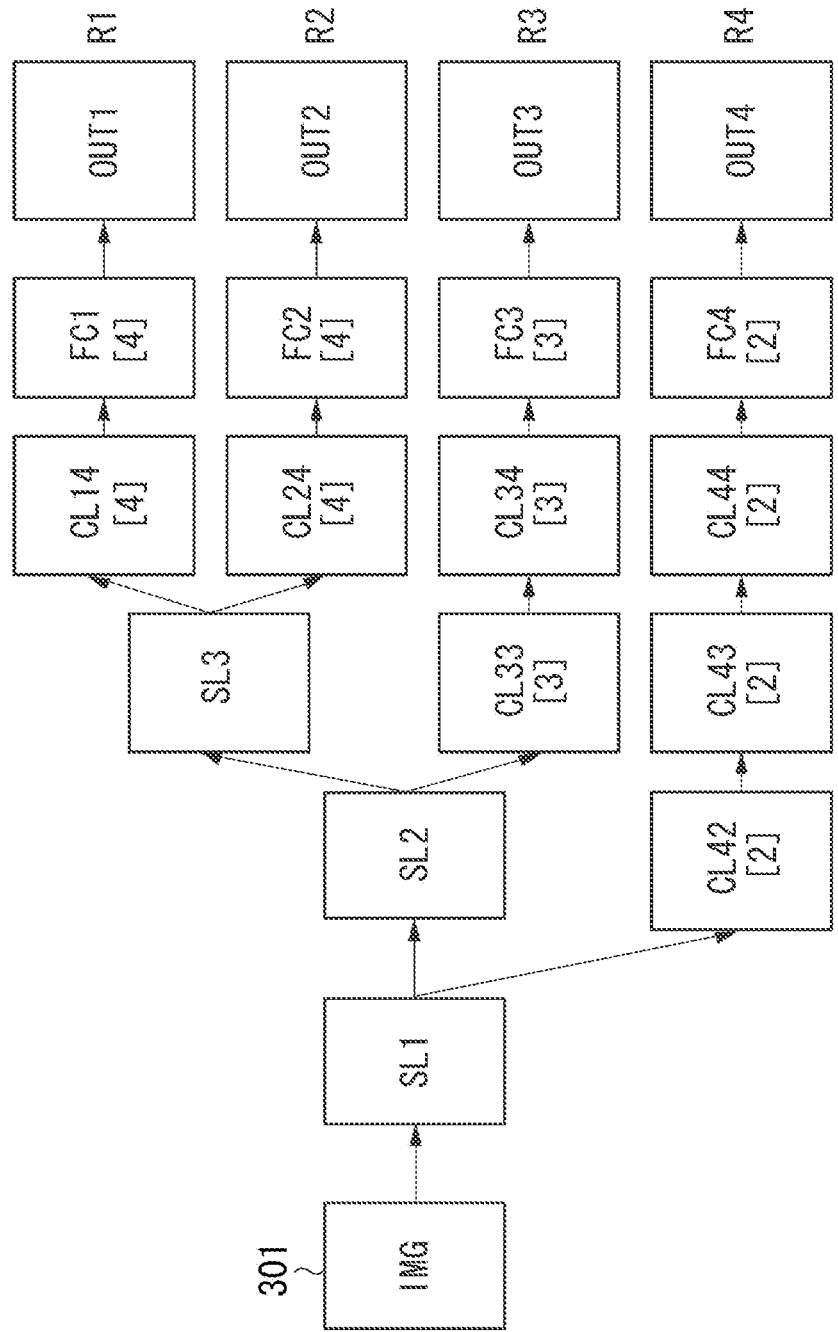
FIG. 10 illustrates a finally determined structure of the multi-task DCNN according to one or more aspects of the present disclosure.

FIG. 10 illustrates the structure of the multi-task DCNN that is determined by the sharing structure determination unit 28 in step S9 in this case. The cumulative number of times of learning is 3 with respect to CL33 and the layers subsequent thereto for the recognition task R3, and the cumulative number of times of learning is 4 for the recognition tasks R1 and R2. In FIG. 10, an arrow extends from SL2 to CL33 regarding the recognition task R3, and an arrow extends from SL2 to SL3 regarding the recognition tasks R1 and R2.

In the next loop with i set to i=4, the IDs of the recognition tasks R1 and R2 are left in the layer sharing task list 35. For example, suppose that the recognition task R2 is determined not to adopt the sharing layer candidate SL4 in step S8 in the loop with i set to i=4 (the same also applies in a case where the recognition task R1, instead of the recognition task R2, is determined not to adopt the shared layer candidate SL4, or both the recognition tasks R1 and R2 are determined not to adopt the shared layer candidate SL4).

In this case, such a structure that the recognition tasks R1 and R2 do not share the shared layer candidate SL4 is generated as the final structure of the multi-task DCNN, and this DCNN is stored into the learned DCNN 33. This structure is illustrated in FIG. 10. FIG. 10 indicates that the cumulative number of times of learning remains 4 with respect to layers $CL_{T4}$ (T=1 or 2) of the recognition tasks R1 and R2, and the layers $CL_{T4}$ hold the learning parameters learned in the previous loop. The shared layer candidate SL4 generated from the shared layer candidate population of a fourth layer in the loop with i set to i=4 is discarded, and is not illustrated in FIG. 10.

In the above-described manner, whether to use the shared layer candidate SLi is determined for each of the recognition tasks according to whether the degree of degradation of the accuracy when the i-th layer of each of the recognition tasks is shared as the shared layer candidate SLi falls within the allowable range. Then, the structure of the multi-task DCNN desirable for each of the recognition tasks is determined according to a result of this determination.

(Processing by Shared Layer Candidate Generation Unit 22)

Figure 11:
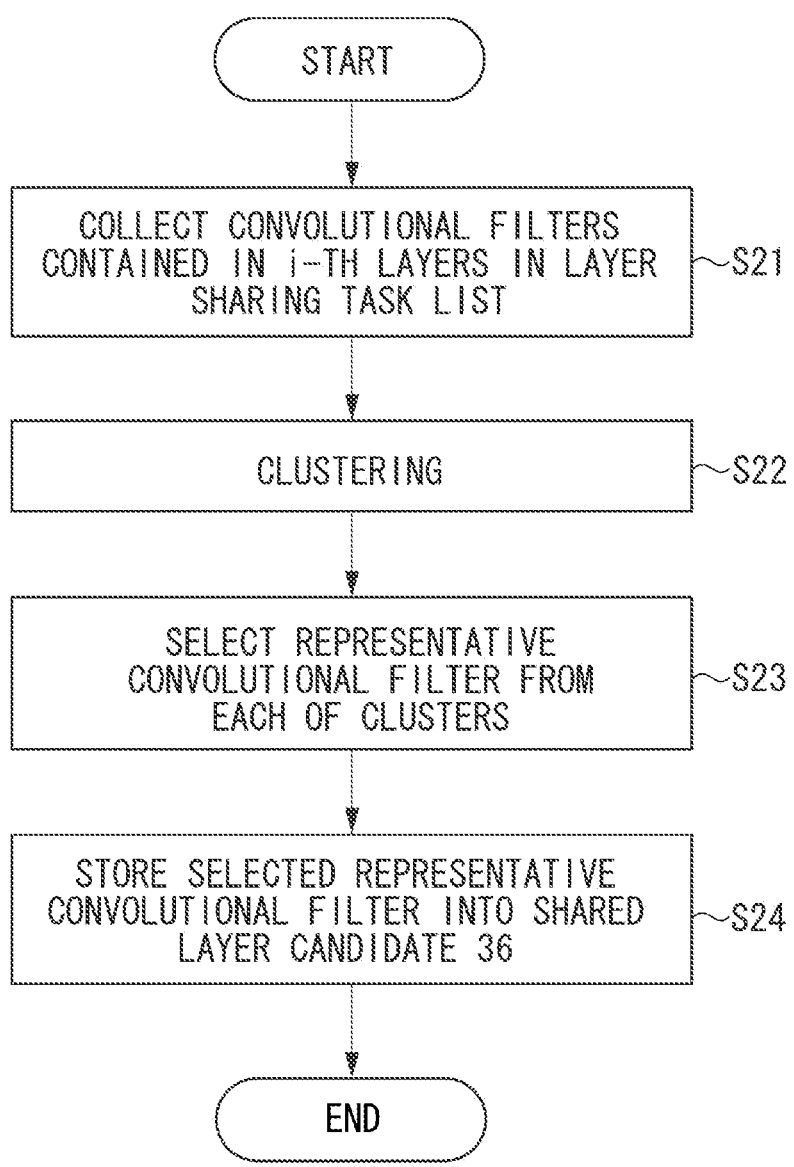
FIG. 11 is a flowchart illustrating processing performed by the shared layer candidate generation unit according to one or more aspects of the present disclosure.

In the following description, the processing performed by the shared layer candidate generation unit 22 according to the first exemplary embodiment will be described with reference to a flowchart illustrated in FIG. 11. This is the processing performed in step S4 illustrated in FIG. 3.

The shared layer candidate generation unit 22 generates the shared layer candidate by selecting the representative convolutional filter from all of the convolutional filters (the shared layer candidate population) contained in the predetermined layers of all of the recognition tasks recorded in the layer sharing task list 35. In the present exemplary embodiment, the predetermined layer is assumed to be the i-th layer, but may include even layers preceding and subsequent to the i-th layer. The index i is the same as the index i used in steps S4 to S11 illustrated in FIG. 3.

In step S21, the shared layer candidate generation unit 22 copies (collects) all of the convolutional filters from the predetermined layers (the i-th layers) of the recognition tasks recorded in the layer sharing task list 35, and stores the copied convolutional filters into the shared layer candidate population 39 in the second memory 15. The shared layer candidate generation unit 22 does not copy the convolutional filter of the recognition task that is not recorded in the layer sharing task list 35.

In step S22, the shared layer candidate generation unit 22 divides the shared layer candidate population 39 into a predetermined number of clusters by the clustering, and stores a result thereof into the filter cluster 40 in the second memory 15. In the following description, CK will be used to represent this predetermined number. The filter cluster 40 is data in which the convolutional filters in the shared layer candidate population 39 are classified cluster by cluster and are stored.

The predetermined number CK may be set by the user, or may be set to an average value of the numbers of filters $NCL_{Ti}$ at the i-th layers of the individual recognition tasks or a value acquired by multiplying this average value by a coefficient additionally specified by the user.

If the predetermined number CK is set to the average value of the numbers of filters $NCL_{Ti}$ at the i-th layers of the individual recognition tasks, the predetermined number CK is set to a value indicated by an equation 1.

$$CK = (\Sigma_T NCL_{Ti})/NS(T \in \text{the layer sharing task list}) \quad \text{(Equation 1)}$$

However, assume that T in the equation 1 does not represent the task IDs of all of the recognition tasks but represents the task IDs recorded in the layer sharing task list 35. In addition, assume that NS in the equation 1 represents the number of recognition tasks recorded in the layer sharing task list 35.

The clustering can be carried out with use of a method such as k-means clustering (k-means). The clustering employed in the present exemplary embodiment is not limited to a specific method. Possible variations of a definition about a distance/similarity usable as an evaluation criterion for the clustering include the following several examples.
(1) a Euclidean distance of the convolutional filter itself
(2) a Euclidean distance in a result when the learning image is convoluted with the convolutional filter
(3) a Euclidean distance in a result when the result of (2) is multiplied by an activating function In the variation (1), the shared layer candidate generation unit 22 simply calculates a Euclidean distance between the parameters of the convolutional filters. In the case of the variation (1), it can also be said that the shared layer candidate population 39 is subjected to the clustering according to a similarity in the parameter of the convolutional filter itself. A Euclidean distance between the learning parameters may be used as the Euclidean distance between the parameters of the convolutional filters. Further, in the case of the variation (1), it can also be said that the shared layer candidate population 39 is subjected to the clustering according to an image similarity with the learning parameter assumed to be an image filter. If the clustering of the variation (2) is expressed by a similarity, it can be said that the shared layer candidate population 39 is subjected to the clustering according to a similarity in a property about how the convolutional filter reacts to a distribution of learning images that are image samples possible to be actually input to the convolutional filter. The learning images (the learning data) used here do not necessarily have to be the entire image data of the learning data 30, and may be a subset including learning images acquired by randomly selecting an appropriate number of images from the learning data 30. The similarly of the variation (2) can also be said to be a similarity in an output result when the image filter is applied to a predetermined image. If the clustering of the variation (3) is expressed by a similarity, the shared layer candidate population 39 can be said to be subjected to the clustering according to a similarity in which a property of the activating function used in the NN is also reflected in addition to the variation (2). This similarity can also be said to be a similarity in a result when predetermined non-linear processing is applied to the similarity in the output result when the above-described image filter is applied to the predetermined image.

The above-described definitions about the distance and similarity are only one example, and a definition other than the above-described examples may be applicable. Other examples applicable as the similarity include a similarity in a result when predetermined pooling processing is performed on the similarity in the output when the above-described predetermined non-linear processing in the variation (3) is applied.

In step S23, the shared layer candidate generation unit 22 selects the representative convolutional filter from each of the clusters in the filter cluster 40. An average filter of the convolutional filters contained in each of the clusters may be selected as the representative convolutional filter. A centroid of the cluster may be selected as the representative convolutional filter. A filter randomly sampled one by one from the convolutional filters contained in each of the clusters may be selected as the representative convolutional filter. The method for selecting the representative convolutional filter is not limited to the above-described examples.

In step S24, the shared layer candidate generation unit 22 stores the CK representative convolutional filters each selected for each of the clusters in step S23 into the shared layer candidate 36, and ends the processing.

In the method that selects (extracts) the representative convolutional filter by carrying out the clustering as in the above-described example, the selected filters do not include a plurality of similar convolutional filters and thoroughly cover convolutional filters having dissimilar tendencies to one another. As a result, various features of images can be extracted, and a shared layer candidate sharable among as many recognition tasks as possible is generated. The convolutional filter is contained in the learning parameter, so that the selection of the representative convolutional filter by the above-described clustering can also be said to be a selection of a representative learning parameter by the clustering.

The method using the clustering does not necessarily have to be employed as the method for selecting the representative convolutional filter. For example, the representative convolutional filter may be randomly selected (randomly sampled) from the shared layer candidate population 39 to be set as the shared layer candidate. In this case, similar convolutional filters may be accidentally selected as the representative convolutional filters, but the representative convolutional filter can be selected according to an original tendency of the shared layer candidate population 39. Making the selection in this manner results in generation of an intermediate layer candidate suitable for recognition tasks belonging to a majority having similar tendencies, and thus generation of an intermediate layer candidate not so much suitable for recognition tasks dissimilar thereto. Accordingly, the learning apparatus 10 can induce (generate) such a multi-task DCNN structure that a recognition task dissimilar to a group of the other recognition tasks branches off at a layer close to the input.

In the above description, the convolutional filters stored into the shared layer candidate population 39 in step S21 have been described as being all of the convolutional filters contained in the i-th layers of the recognition tasks written in the layer sharing task list 35, but the processing in step S21 is not limited thereto. For example, all of the convolutional filters contained in the i-th layers and n layers preceding and subsequent to the i-th layers may be stored into the shared layer candidate population 39. For example, n is a parameter determined by the user.

Storing the convolutional filters in this manner allows, in such a case that a convolutional filter at the j-th layer ($j \approx i$)

of some specific recognition task is valid as the convolutional filter at the i-th layer of a different recognition task, this convolutional filter to be introduced into the shared layer candidate.

(Processing by Shared Layer Candidate Adoption/Rejection Determination Unit 24)

Figure 12:
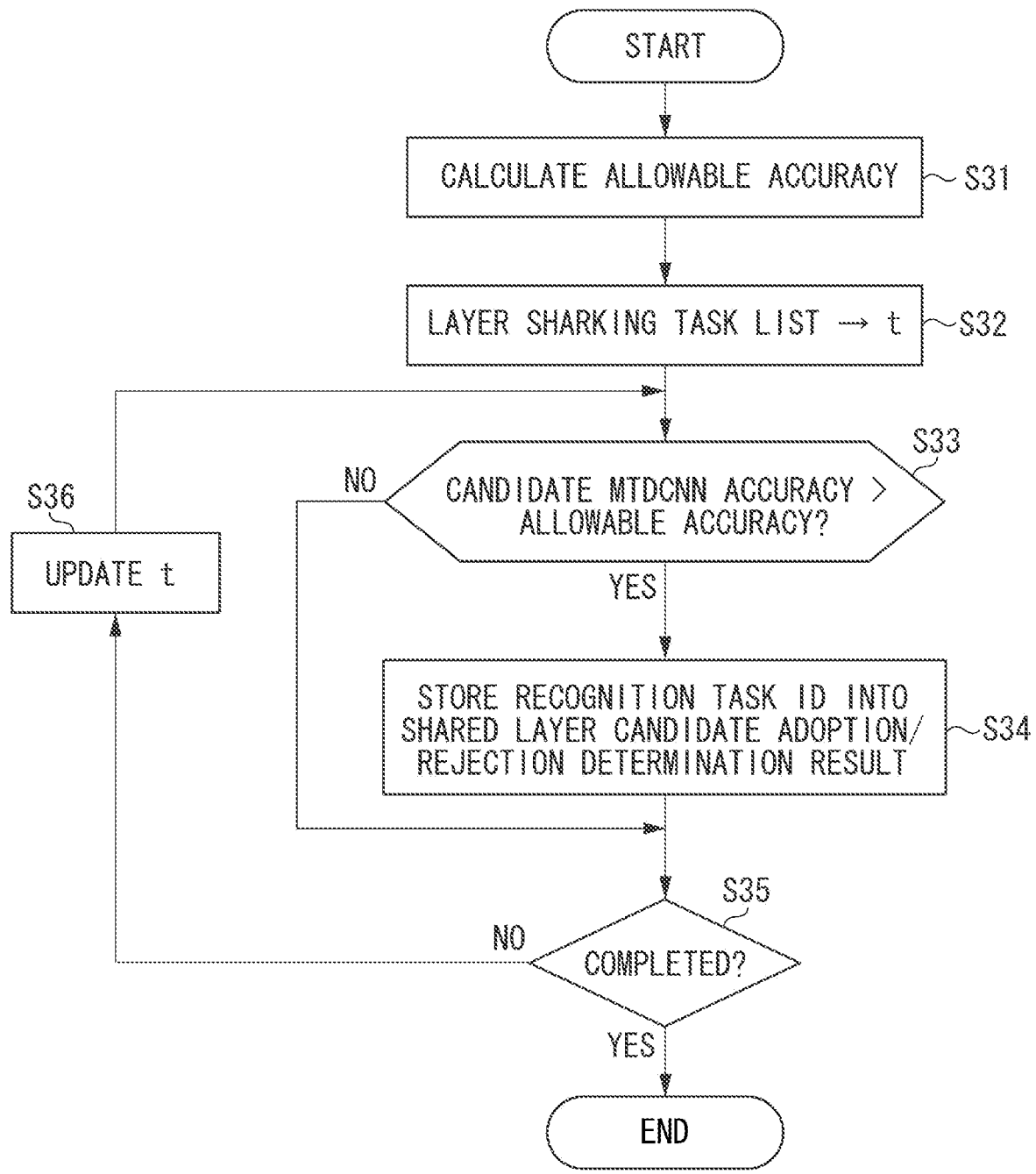
FIG. 12 is a flowchart illustrating processing performed by a shared layer candidate adoption/rejection determination unit according to one or more aspects of the present disclosure.

Next, the processing performed by the shared layer candidate adoption/rejection determination unit 24 according to the first exemplary embodiment will be described with reference to FIG. 12. This processing is performed in step S8 illustrated in FIG. 3.

First, in step S31, a result of multiplying the initial accuracy 34 in the second memory 15 illustrated in FIG. 1 by the allowable degradation degree 32 is held, as the allowable accuracy 41. As described above with reference to FIG. 1, the allowable degradation degree 32 is set with use of the real value of 0.0 or larger and 1.0 or smaller for each of the recognition tasks, and is stored in the second memory 15 in advance. For both the initial accuracy 34 and the allowable degradation degree 32, values thereof with respect to all of the recognition tasks are stored in the second memory 15, so that the allowable accuracy 41 is also calculated with respect to all of the recognition tasks.

In the following description, t will be used to represent the task ID of the recognition task targeted for the processing.

In step S32, the shared layer candidate adoption/rejection determination unit 24 sets the task ID written at a top of the layer sharing task list 35 into the variable t. After step S32, the shared layer candidate adoption/rejection determination unit 24 sequentially repeats the following processing with respect to the recognition tasks written in the layer sharing task list 35.

In step S33, the shared layer candidate adoption/rejection determination unit 24 compares the candidate multi-task DCNN accuracy 38 in the second memory 15 and the allowable accuracy 41 acquired in step S31 with respect to the recognition task having the task ID t. If the candidate multi-task DCNN accuracy 38 is higher than the allowable accuracy 41 with respect to the recognition task having the task ID t (YES in step S33), the processing proceeds to step S34. In step S34, the recognition task having the task ID t is determined to adopt the shared layer candidate. This result of the determination is stored into the shared layer candidate adoption/rejection determination result 42 in the second memory 15. This storage can be carried out by, for example, writing the list of task IDs of recognition tasks determined to adopt the shared layer candidate. After step S34, the processing proceeds to step S35. The determination in step S33 is a determination for an evaluation of the relearning, and the evaluation of the relearning can also be said to be carried out based on whether the accuracy of the multi-layer neural network when the shared layer candidate is used falls within the allowable range.

If the candidate multi-task DCNN accuracy 38 is lower than the allowable accuracy 41 or the candidate multi-task DCNN accuracy 38 is equal to the allowable accuracy 41 (NO in step S33), the processing proceeds to step S35. In step S35, the shared layer candidate adoption/rejection determination unit 24 determines whether the above-described processing has been completed with respect to all of the recognition tasks written in the layer sharing task list 35. This determination can be made by, for example, determining whether the current value of t (the task ID) is the last task ID written in the layer sharing task list 35. If the shared layer candidate adoption/rejection determination unit 24 determines that the processing has been completed in step S35 (YES in step S35), the processing is ended at this time. If the shared layer candidate adoption/rejection determination unit 24 determines that the processing has not been completed in step S35 (NO in step S35), the processing proceeds to step S36.

In step S36, the shared layer candidate adoption/rejection determination unit 24 changes (updates) the variable t indicating the task targeted for the processing. After step S36, the processing returns to step S33, and the shared layer candidate adoption/rejection determination unit 24 performs similar processing with respect to the next recognition task. The processing for updating t in step S36 can be realized by updating t to the task ID written next to the current value of t in the layer sharing task list 35. The processing proceeds in the above-described manner at the time of the learning (the learning phase) according to the present exemplary embodiment.

In a case where the recognition processing is performed on an unknown input image, an input of the image data (the input image) to the learned DCNN 33 causes an output value to appear on an output node of each of the recognition tasks, so that an intended function can be fulfilled by using this output value as a result of the recognition. This is a method generally practiced at the time of the recognition (the recognition phase) when using the learned NN.

In the above description, the learning apparatus 10 has been described as employing the method that starts with the initial structure as in the example illustrated in FIG. 2 that can be regarded as the plurality of single-task DCNNs and gradually determines the sharing for each predetermined layer, but may employ a multi-task DCNN structure originally partially having a sharing structure as the initial structure. For example, supposing that a multi-task DCNN structured as illustrated in FIG. 9 is already learned separately, the present exemplary embodiment may be applied to this multi-task DCNN as the initial structure. In this case, the present exemplary embodiment can be realized by identifying (finding out) such a shared layer that is not followed by a branch subsequent thereto, and performing processing as in the processing described in the present exemplary embodiment with respect to a partial structure at and after this shared layer. Supposing that the DCNN structure illustrated in FIG. 9 is processed as the initial structure, the present exemplary embodiment can be realized by applying the present processing to a partial structure at and after the shared layer candidate SL2 in this case. In other words, in the case where the multi-task DCNN already has the shared layer candidates (SL1 and SL2) in a predetermined layer range, the present exemplary embodiment can be realized by generating the shared layer candidate with respect to a layer next to the last shared layer candidate (SL2) in the predetermined layer range.

In FIG. 1, the learning apparatus 10 is illustrated as including the input device 12 and the output device 13, but one or both of the input device 12 and the output device 13 may be provided outside the learning apparatus 10.

The learning apparatus 10 according to the first exemplary embodiment produces the following advantageous effects.

Figure 3:
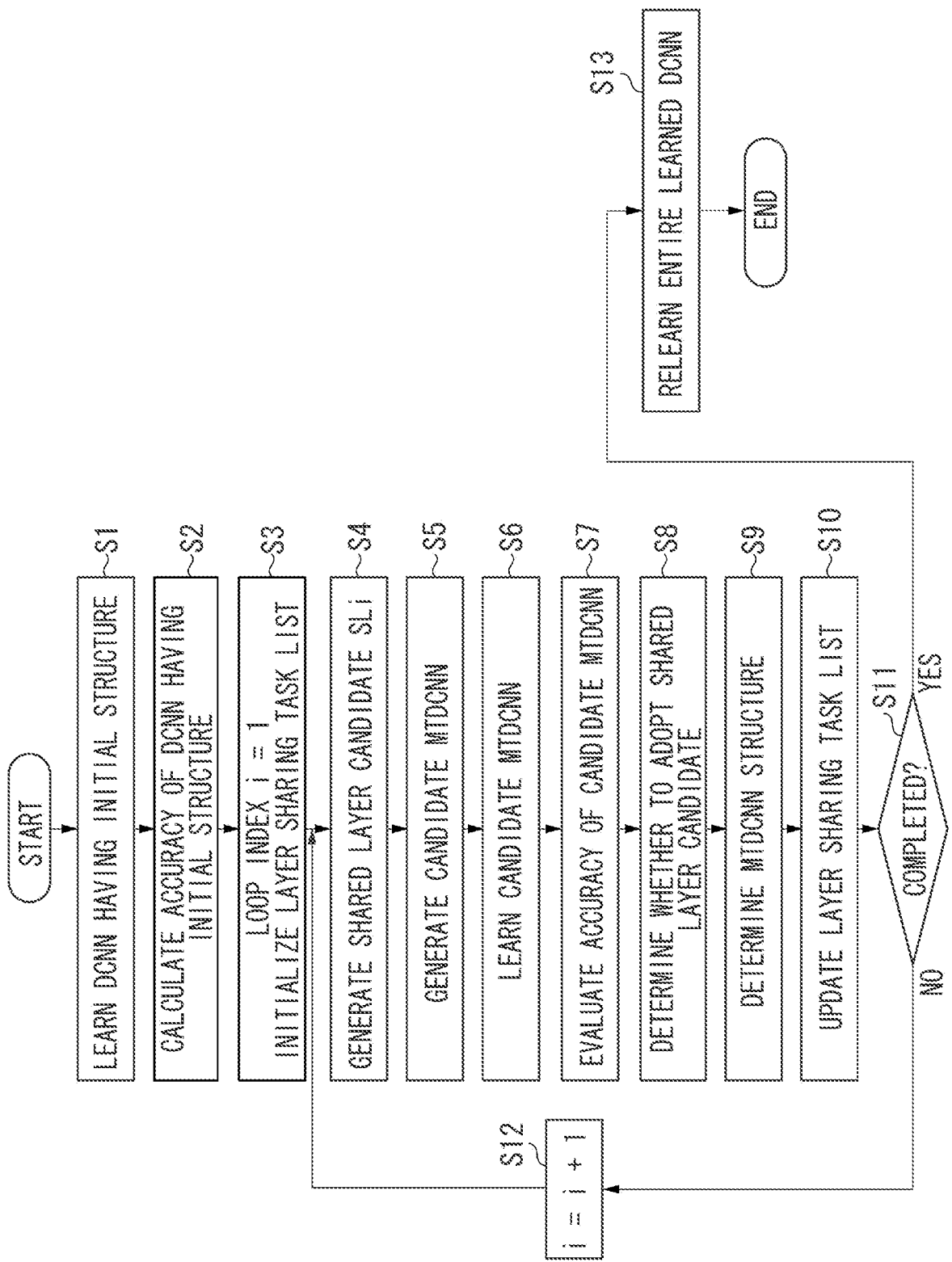
FIG. 3 is a flowchart illustrating processing performed by the learning apparatus according to one or more aspects of the present disclosure

The learning apparatus 10 can automatically determine the structure of the multi-task DCNN desirable for the plurality of recognition tasks by performing the processing based on the control flow illustrated in FIG. 3.

The learning apparatus 10 does not have to thoroughly search as many times as the number of all possible combinations of structures in finding out (determining) the desirable structure of the multi-task DCNN, and can determine the desirable multi-task DCNN structure by conducting the learning the number of times that is approximately equal to the number of layers.

The learning apparatus 10 determines a sharing possibility only by generating (acquiring) the shared layer candidate from the entire convolutional filters (the shared layer candidate population 39) at the predetermined layers in the DCNN acquired by learning the recognition tasks individually, and evaluating the accuracy of each of the recognition tasks in the multi-task DCNN using this shared layer candidate. Accordingly, the learning apparatus 10 can significantly limit (reduce) a search range in finding out (determining) the desirable structure of the multi-task DCNN.

The learning apparatus 10 can generate the shared layer candidate that can be expected to be suitable for each of the recognition tasks by generating the shared layer candidate from the shared layer candidate population 39 including the convolutional filters at the convolutional layers learned for each of the recognition tasks.

The learning apparatus 10 can reduce the memory capacity required when the plurality of recognition processes is performed compared with the case where distinct DCNNs for the individual recognition tasks is held, and can also speed up the processing speed.

In the conventional multi-task learning, for example, a single classifier performs a learning so as to exhibit a highest performance when processing a given plurality of recognition tasks. In such a case, the structure of the classifier has a given one structure, and an aim here is focused on how the learning is optimally carried out on this structure. In such a case, which recognition tasks should be processed by the multi-tasking between or among them and up to which portion should be targeted for the multi-tasking are entirely left out of consideration. In other words, desirably determining the network (NN) structure itself is not considered at all. By contrast, according to the learning apparatus 10 of the first exemplary embodiment, it is possible to desirably determine the network structure itself (which recognition tasks should be processed by the multi-tasking between or among them and up to which portion should be targeted for the multi-tasking).

The conventional multi-task learning also fails to propose finding out such a combination of recognition tasks that the recognition performance would be higher when they are not processed by the multi-tasking, and automatically determining to learn while excluding these recognition tasks from the multi-task learning. Accordingly, the conventional multi-task learning necessitates the thorough search to acquire the desirable multi-task DCNN structure, and takes time. By contrast, according to the learning apparatus 10 of the first exemplary embodiment, it is possible to automatically exclude the recognition task that is better not to be subjected to the multi-tasking process from the multi-task learning. Accordingly, according to the learning apparatus 10 of the first exemplary embodiment, the thorough search is not conducted when the desirable multi-task DCNN structure is acquired, and thus, the processing time period can be reduced compared to the conventional multi-task learning.

The above-described Caruana's literature confirms up to which layer can be shared between two recognition tasks experimentally (by trial and error), but fails to propose a method for determining the multi-task DCNN structure desirable for a given plurality of recognition tasks. Although it is also possible to thoroughly search for the desirable structure by repeating the performance evaluation experiment as in the above-described literature on all of candidates of the multi-task DCNN structure, the thorough search takes time. By contrast, according to the learning apparatus 10 of the first exemplary embodiment, the thorough search is not conducted when the desirable multi-task DCNN structure is acquired, and therefore the processing time period can be reduced.

The learning apparatus 10 according to the first exemplary embodiment searches for the processing layer that does not result in the degradation in the performance even if the content of the processing is shared between or among the plurality of multi-layer NNs acquired by learning the plurality of recognition tasks, respectively (repeats the generation of the shared layer candidate and the evaluation). Accordingly, the learning apparatus 10 can calculate the structure of the multi-task multi-layer NN that can achieve high-speed processing with a further small memory capacity while maintaining a performance similar to the performance when learning each of the tasks alone. In other words, the learning apparatus 10 learns so as to efficiently search for the desirable structure of the multi-task DCNN that carries out the plurality of recognition tasks simultaneously. In this manner, the learning apparatus 10 allows the recognition tasks to share the intermediate layer in the DCNN between or among them without reducing the accuracies of the recognition tasks, thereby succeeding in saving the memory usage and speeding up the processing speed at the time of the recognition processing.

An embodiment including the shared layer candidate generation unit 22 having processing and a structure different from the first exemplary embodiment will be described as a second exemplary embodiment. In the following description, the second exemplary embodiment will be described focusing on differences from the first exemplary embodiment, and the same reference numerals will be used for features and elements similar to the first exemplary embodiment.

The shared layer candidate generation unit 22 according to the first exemplary embodiment selects the convolutional filter that should be used as the shared layer candidate by dividing the shared layer candidate population 39 into the CK clusters by the clustering and selecting the representative convolutional filter from each of the clusters. In other words, in the first exemplary embodiment, the shared layer candidate generation unit 22 selects and generates the shared layer candidate through the method called clustering from all of the convolutional filters contained in the convolutional layers $CL_{Ti}$ at the i-th layers of all of the recognition tasks written in the layer sharing task list 35 (the shared layer candidate population 39). The shared layer candidate generation unit 22 controls (reduces) the number of convolutional filters that should be used as the shared layer candidate due to such selection and generation of the shared layer candidate. In the second exemplary embodiment, the shared layer candidate generation unit 22 generates the shared layer candidate by reducing the parameters (the learning parameters) of the convolutional filters contained in the shared layer candidate population 39 with use of a data compression method. To achieve that, the shared layer candidate generation unit 22 according to the second exemplary embodiment includes a data compression unit that compresses data of the parameters.

In the present exemplary embodiment, the data compression refers to processing that approximates and substitutes a convolutional filter having a large number of parameters by and with a convolutional filter having a smaller number of parameters. In the DCNN, there is a method for approximating a convolutional filter learned once by a smaller number of parameters with use of a method such as matrix decomposition. The learning apparatus 10 controls the number of parameters of the convolutional filters contained in the shared layer candidate with the number of clusters CK in the first exemplary embodiment, but controls the number of parameters with a setting of the data compression processing in the second exemplary embodiment.

Generally, limiting the setting of the number of parameters to a small number leads to degradation of an approximation accuracy. Then, the degree of degradation in the performance (the recognition accuracy and the recognition performance) and how much the number of parameters reduces by the data compression are in a trade-off relationship. However, if many of the convolutional filters contained in the shared layer candidate population 39 are similar convolutional filters, it can be expected that the performance is not largely affected even when the number of parameters reduces to some degree. This is the same as the fact that it can be expected that the performance is not degraded so much even when the filter is selected by the clustering in the first exemplary embodiment.

Such data compression on the convolutional filter is discussed in, for example, the following literature.

This literature is "Speeding up Convolutional Neural Networks with Low Rank Expansions" written by M. Jaderberg, A. Vedaldi, and A. Zisserman (2014) on arXiv preprint, arXiv: 1405.3866. In this literature, N convolutional filters having a size of d*d in an original DCNN are approximated by being decomposed into M (M<N) vectors of d*1*1, M vectors of 1*d*1, and N vectors of 1*d*M, by which the number of parameters is reduced. The N convolutional filters may be approximated by being decomposed into K (K<N) vectors of d*1*1 and N vectors of d*1*K.

The data compression on the convolutional filter is also discussed in the following literature.

This literature is "Efficient and Accurate Approximations of Nonlinear Convolutional Networks" written by X. Zhang, J. Zou, X. Ming, K. He, and J. Sun (2014) on arXiv preprint, arXiv: 1411.4299. In this literature, originally N convolutional filters are approximated by M (M<N) convolutional filters having the same size and N vectors of 1*1*M, by which the number of parameters is reduced. A setting parameter in each of the methods described above by way of example can be acquired by, for example, a user appropriately determining that.

The shared layer candidate generation unit 22 according to the second exemplary embodiment calculates the convolutional filter approximated by the data compression method, and stores this filter into the second memory 15 as the shared layer candidate 36. When the NN is subjected to feedforward, for example, at the time of the accuracy evaluation, this can be achieved by carrying out a convolutional calculation using the approximated convolutional filter based on the data compression method corresponding to each case.

In a case where the multi-task multi-layer NN relearning unit 25 relearns the shared layer candidate SLi, this can be realized by reversely generating a predetermined number of convolutional filters from the approximated convolutional filter, and starting the learning with use of them as the initial value. The predetermined number may be determined based on the equation 1 or the like as in the first exemplary embodiment, or may be set to a value around the number of filters contained in the shared layer candidate population 39 of this layer. This layer may be compressed by the data compression unit again after the relearning to be then replaced with the approximated convolutional filter.

In the configuration according to the second exemplary embodiment, the shared layer candidate generation unit 22 does not select the representative convolutional filter (generate the shared layer candidate) from the convolutional filters contained in the shared layer candidate population 39 as in the first exemplary embodiment, but generates a group of filters (the shared layer candidate) optimally or desirably approximating the entire shared layer candidate population 39. As a result, this configuration can be expected to bring about an advantageous effect of allowing the generated shared layer candidate to suit further more recognition tasks.

In the above description, the data compression is assumed to refer to the processing that approximates and substitutes the convolutional filter having a large number of parameters by and with the convolutional filter having a smaller number of parameters, but the data compression may be realized by another method. For example, such processing that puts a plurality of filters together into a single filter may be performed by the data compression. This single filter may be a filter in a form that does not exist in the shared layer candidate population 39. Performing the processing that puts the plurality of filters into the single filter a plurality of times can reduce the number of filters in the shared layer candidate population 39, and generate a group of filters (the shared layer candidate) optimally or desirably approximating the entire shared layer candidate population 39.

Other Embodiments

Embodiment(s) of the present disclosure can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present disclosure has been described with reference to exemplary embodiments, the scope of the following claims is to be accorded the broadest interpretation so as to encompass all such modifications and equivalent structures and functions.

This application claims the benefit of Japanese Patent Application No. 2016-104025, filed May 25, 2016, which is hereby incorporated by reference herein in its entirety.

What is claimed is:

1. An information processing apparatus comprising:
one or more processors; and
at least one memory coupled to the one or more processors, the memory having stored thereon instructions which, when executed by the one or more processors, cause the apparatus to:
learn a plurality of multi-layer neural networks configured to carry out a plurality of tasks;
generate a shared layer candidate at a predetermined layer between or among the plurality of multi-layer neural networks by carrying out clustering to divide learning parameters at the predetermined layer into a plurality of clusters and selecting a representative learning parameter from the plurality of clusters;
relearn the plurality of multi-layer neural networks in a structure using the shared layer candidate; and
determine whether the shared layer candidate is to be shared at the predetermined layer with respect to each of the plurality of tasks based on an evaluation of the relearning.

2. The information processing apparatus according to claim 1, wherein the predetermined layer is at least one layer in the multi-layer neural networks, and
wherein the information processing apparatus further determines a final structure of the plurality of multi-layer neural networks based on a result of the determination with respect to the shared layer candidate generated for each of the at least one layer.

3. The information processing apparatus according to claim 2, further output the structure of the plurality of multi-layer neural networks that is determined.

4. The information processing apparatus according to claim 2, further relearn the plurality of multi-layer neural networks having the structure determined.

5. The information processing apparatus according to claim 4, further relearn in the structure of the plurality of multi-layer neural networks using the shared layer candidate, in a case where the predetermined layer includes a plurality of layers, determine every time that the shared layer candidate is to be shared with respect to one of the predetermined layers.

6. The information processing apparatus according to claim 5, further comprising:
evaluate a performance of each of the tasks relearned; and
output the evaluation.

7. The information processing apparatus according to claim 1, wherein the shared layer candidate by carrying out the clustering to divide the learning parameters including learning parameters at layers preceding and subsequent to the predetermined layer into the plurality of clusters and selecting the representative learning parameter from this plurality of clusters is generated.

8. The information processing apparatus according to claim 1, wherein the generation carries out the clustering based on a similarity, and the similarity is any of an image similarity with the learning parameter assumed to be an image filter, a similarity in an output result when the image filter is applied to a predetermined image, a similarity in a result when predetermined non-linear processing is applied to the similarity in the output result when the image filter is applied to the predetermined image, and a similarity in a result when predetermined pooling processing is performed on the similarity in the result when the predetermined non-linear processing is applied.

9. The information processing apparatus according to claim 1, wherein the shared layer candidate by randomly sampling a learning parameter at the predetermined layer is generated.

10. The information processing apparatus according to claim 1, wherein the shared layer candidate by compressing data about a learning parameter at the predetermined layer is generated.

11. The information processing apparatus according to claim 1, wherein the evaluation of the relearning is whether accuracy of the multi-layer neural networks in a case where the shared layer candidate is used falls within an allowable range.

12. The information processing apparatus according to claim 1, wherein, the shared layer candidate with respect to a layer next to a last shared layer candidate in the predetermined layer range is generated in a case where the plurality of multi-layer neural networks already includes the shared layer candidate in a predetermined layer range.

13. A recognition processing apparatus configured to perform recognition processing by the plurality of multi-layer neural networks acquired by the information processing apparatus according to claim 1.

14. An information processing method comprising:
learning a plurality of multi-layer neural networks configured to carry out a plurality of tasks;
generating a shared layer candidate at a predetermined layer between or among the plurality of multi-layer neural networks by carrying out clustering to divide learning parameters at the predetermined layer into a plurality of clusters and selecting a representative learning parameter from the plurality of clusters; and
relearning the plurality of multi-layer neural networks in a structure using the shared layer candidate, and determining whether the shared layer candidate is to be shared at the predetermined layer with respect to each of the plurality of tasks based on an evaluation of this relearning.

15. A non-transitory computer-readable storage medium storing a program for causing a computer to:
learn a plurality of multi-layer neural networks configured to carry out a plurality of tasks;
a generation unit configured to generate a shared layer candidate at a predetermined layer between or among the plurality of multi-layer neural networks by carrying out clustering to divide learning parameters at the predetermined layer into a plurality of clusters and selecting a representative learning parameter from the plurality of clusters;
relearn the plurality of multi-layer neural networks in a structure using the shared layer candidate; and
determine whether the shared layer candidate is to be shared at the predetermined layer with respect to each of the plurality of tasks based on an evaluation of the relearning.

* * * * *